United States Patent
Herath et al.

(10) Patent No.: US 10,721,114 B2
(45) Date of Patent: Jul. 21, 2020

(54) METHOD AND SYSTEM FOR SYMBOL SEQUENCE GENERATION AND TRANSMISSION FOR NON-ORTHOGONAL MULTIPLE ACCESS TRANSMISSION

(71) Applicants: Sanjeewa Herath, Ottawa (CA); Alireza Bayesteh, Ottawa (CA); Ming Jia, Ottawa (CA); Jianglei Ma, Ottawa (CA); Peiying Zhu, Ottawa (CA); Wen Tong, Ottawa (CA)

(72) Inventors: Sanjeewa Herath, Ottawa (CA); Alireza Bayesteh, Ottawa (CA); Ming Jia, Ottawa (CA); Jianglei Ma, Ottawa (CA); Peiying Zhu, Ottawa (CA); Wen Tong, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/821,809

(22) Filed: Nov. 23, 2017

(65) Prior Publication Data
US 2019/0158338 A1    May 23, 2019

(51) Int. Cl.
*H04L 27/34*     (2006.01)
*H04W 72/04*     (2009.01)
(Continued)

(52) U.S. Cl.
CPC .............. *H04L 27/34* (2013.01); *H04L 5/003* (2013.01); *H04L 27/3488* (2013.01);
(Continued)

(58) Field of Classification Search
CPC .................. H04B 1/69; H04B 1/71057; H04B 2201/70716; H04B 2201/7097
See application file for complete search history.

(56) References Cited

U.S. PATENT DOCUMENTS 10,136,468 B2 * 11/2018 Kimura ............... H04W 72/044
2002/0126650 A1 * 9/2002 Hall ....................... H01Q 1/246
370/349
(Continued)

FOREIGN PATENT DOCUMENTS

CN      106209329 A      12/2016
CN      107171770 A       9/2017
(Continued)

OTHER PUBLICATIONS

Final Report of 3GPP TSG RAN WG1 #86bis v1.0.0 (Lisbon, Portugal, Oct. 10-14, 2016), 3GPP TSG RAN WG1 Meeting #87, R1-1611081, Reno, USA, Nov. 14-18, 2016.

*Primary Examiner* — Ayaz R Sheikh
*Assistant Examiner* — Debebe A Asefa

(57) ABSTRACT

Methods and systems are disclosed for symbol sequence generation and transmission for non-orthogonal multiple access (NoMA) transmission. A NoMA signal may be generated based on: (1) a first symbol sequence, the first symbol sequence determined from a set of input bits and associated with a first MA signature within a first MA signature space; (2) a second symbol sequence determined based on the first symbol sequence, the second symbol sequence being associated with a second MA signature within a second MA signature space; and (3) a symbol-to-resource element mapping applied to the second symbol sequence to produce the NoMA signal.

23 Claims, 15 Drawing Sheets

(51) Int. Cl.
      *H04L 5/00*           (2006.01)
      *H04W 88/08*       (2009.01)
      *H04L 27/26*        (2006.01)
      *H04W 88/02*       (2009.01)

(52) U.S. Cl.
      CPC ........... *H04W 72/04* (2013.01); *H04L 5/0044* (2013.01); *H04L 27/2614* (2013.01); *H04W 88/02* (2013.01); *H04W 88/08* (2013.01)

(56) References Cited

U.S. PATENT DOCUMENTS

| | | | |
|---|---|---|---|
| 2011/0122970 A1* | 5/2011 | Chappaz | H04L 27/2017 375/308 |
| 2013/0155891 A1* | 6/2013 | Dinan | H04B 7/0456 370/252 |
| 2015/0312070 A1* | 10/2015 | Lee | H03M 9/00 375/257 |
| 2015/0312074 A1* | 10/2015 | Zhu | H04L 27/2627 370/329 |
| 2018/0070265 A1* | 3/2018 | Seo | H04L 1/0026 |
| 2018/0077685 A1 | 3/2018 | Wu et al. | |
| 2018/0337816 A1 | 11/2018 | Herath et al. | |

FOREIGN PATENT DOCUMENTS

| | | | |
|---|---|---|---|
| WO | 2015000511 A1 | 1/2015 | |
| WO | WO-2018064582 A1 * | 4/2018 | H04L 1/12 |

* cited by examiner

FIG. 8

| J | x_base | | | | | | | | | | | | | | | | |
|---|---|---|---|---|---|---|---|---|---|---|---|---|---|---|---|---|---|
| | 1 | 2 | 3 | 4 | | | | | | | | | | | | | |
| 2 | $\begin{bmatrix}\sqrt{2}\\0\end{bmatrix}$ | $\begin{bmatrix}0\\\sqrt{2}\end{bmatrix}$ | $\begin{bmatrix}0\\-\sqrt{2}\end{bmatrix}$ | $\begin{bmatrix}-\sqrt{2}\\0\end{bmatrix}$ | | | | | | | | | | | | | |
| 3 | 1 | 2 | 3 | 4 | 5 | 6 | 7 | 8 | | | | | | | | | |
| | $\begin{bmatrix}-a_8+jb_8\\-a_8+jb_8\end{bmatrix}$ | $\begin{bmatrix}a_8+jb_8\\a_8+jb_8\end{bmatrix}$ | $\begin{bmatrix}-a_8-jb_8\\-a_8+jb_8\end{bmatrix}$ | $\begin{bmatrix}a_8-jb_8\\a_8+jb_8\end{bmatrix}$ | $\begin{bmatrix}-a_8+jb_8\\-a_8-jb_8\end{bmatrix}$ | $\begin{bmatrix}a_8+jb_8\\a_8-jb_8\end{bmatrix}$ | $\begin{bmatrix}-a_8-jb_8\\-a_8-jb_8\end{bmatrix}$ | $\begin{bmatrix}a_8-jb_8\\a_8-jb_8\end{bmatrix}$ | | | | | | | | | |
| 4 | 1 | 2 | 3 | 4 | 5 | 6 | 7 | 8 | 9 | 10 | 11 | 12 | 13 | 14 | 15 | 16 |
| | $\begin{bmatrix}1+j\\0\end{bmatrix}$ | $\begin{bmatrix}1\\j\end{bmatrix}$ | $\begin{bmatrix}1\\-j\end{bmatrix}$ | $\begin{bmatrix}1-j\\0\end{bmatrix}$ | $\begin{bmatrix}j\\1\end{bmatrix}$ | $\begin{bmatrix}0\\1+j\end{bmatrix}$ | $\begin{bmatrix}0\\1-j\end{bmatrix}$ | $\begin{bmatrix}-j\\1\end{bmatrix}$ | $\begin{bmatrix}j\\-1\end{bmatrix}$ | $\begin{bmatrix}0\\-1+j\end{bmatrix}$ | $\begin{bmatrix}0\\-1-j\end{bmatrix}$ | $\begin{bmatrix}-j\\-1\end{bmatrix}$ | $\begin{bmatrix}-1+j\\0\end{bmatrix}$ | $\begin{bmatrix}-1\\j\end{bmatrix}$ | $\begin{bmatrix}-1\\-j\end{bmatrix}$ | $\begin{bmatrix}-1-j\\0\end{bmatrix}$ |

| J | $x_{base}$ |
|---|---|
| 2 | $\frac{1}{\sqrt{2}}\begin{bmatrix} 1 & 1 \\ 1 & -1 \end{bmatrix}$ (1-2b) |
| 3 | $\sqrt{\frac{2}{3}}\begin{bmatrix} -\frac{1}{\sqrt{2}} & j & 0 \\ -\frac{1}{\sqrt{2}} & 0 & j \end{bmatrix}$ (1-2b) |
| 4 | $\frac{1}{2}\begin{bmatrix} 1 & 1 & j & j \\ 1 & -1 & j & -j \end{bmatrix}$ (1-2b) |

FIG. 9

| Index | 1 | 2 | 3 | 4 |
|---|---|---|---|---|
| S | $\begin{bmatrix} 1 & 0 \\ 0 & 1 \end{bmatrix}$ | $\begin{bmatrix} 1 & 0 \\ 0 & -1 \end{bmatrix}$ | $\begin{bmatrix} 1 & 0 \\ 0 & j \end{bmatrix}$ | $\begin{bmatrix} 1 & 0 \\ 0 & -j \end{bmatrix}$ |

FIG. 10A

| Index | 1 | 2 | 3 | 4 |
|---|---|---|---|---|
| S | $\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\begin{bmatrix} 1 & 0 & 0 & 0 \\ 0 & -1 & 0 & 0 \\ 0 & 0 & 1 & 0 \\ 0 & 0 & 0 & 1 \end{bmatrix}$ | $\begin{bmatrix} 1 & 0 & 0 & 0 \\ 0 & 1 & 0 & 0 \\ 0 & 0 & -1 & 0 \\ 0 & 0 & 0 & 1 \end{bmatrix}$ | $\begin{bmatrix} 1 & 0 & 0 & 0 \\ 0 & 1 & 0 & 0 \\ 0 & 0 & 1 & 0 \\ 0 & 0 & 0 & -1 \end{bmatrix}$ |

| Index | 5 | 6 | 7 | 8 |
|---|---|---|---|---|
| S | $\begin{bmatrix} 1 & 0 & 0 & 0 \\ 0 & j & 0 & 0 \\ 0 & 0 & 1 & 0 \\ 0 & 0 & 0 & j \end{bmatrix}$ | $\begin{bmatrix} 1 & 0 & 0 & 0 \\ 0 & j & 0 & 0 \\ 0 & 0 & -1 & 0 \\ 0 & 0 & 0 & j \end{bmatrix}$ | $\begin{bmatrix} 1 & 0 & 0 & 0 \\ 0 & j & 0 & 0 \\ 0 & 0 & 1 & 0 \\ 0 & 0 & 0 & -j \end{bmatrix}$ | $\begin{bmatrix} 1 & 0 & 0 & 0 \\ 0 & -1 & 0 & 0 \\ 0 & 0 & 1 & 0 \\ 0 & 0 & 0 & j \end{bmatrix}$ |

| Index | 9 | 10 | 11 | 12 |
|---|---|---|---|---|
| S | $\begin{bmatrix} 1 & 0 & 0 & 0 \\ 0 & 0 & 0 & 0 \\ 0 & 0 & j & 0 \\ 0 & 0 & 0 & j \end{bmatrix}$ | $\begin{bmatrix} 1 & 0 & 0 & 0 \\ 0 & j & 0 & 0 \\ 0 & 0 & -1 & 0 \\ 0 & 0 & 0 & j \end{bmatrix}$ | $\begin{bmatrix} 1 & 0 & 0 & 0 \\ 0 & 1 & 0 & 0 \\ 0 & 0 & j & 0 \\ 0 & 0 & 0 & -j \end{bmatrix}$ | $\begin{bmatrix} 1 & 0 & 0 & 0 \\ 0 & 1 & 0 & 0 \\ 0 & 0 & -1 & 0 \\ 0 & 0 & 0 & j \end{bmatrix}$ |

| Index | 13 | 14 | 15 | 16 |
|---|---|---|---|---|
| S | $\begin{bmatrix} 1 & 0 & 0 & 0 \\ 0 & 0 & j & 0 \\ 0 & 0 & 0 & 0 \\ 0 & 0 & 0 & 1 \end{bmatrix}$ | $\begin{bmatrix} 1 & 0 & 0 & 0 \\ 0 & j & 0 & 0 \\ 0 & 0 & j & 0 \\ 0 & 0 & 0 & -1 \end{bmatrix}$ | $\begin{bmatrix} 1 & 0 & 0 & 0 \\ 0 & j & 0 & 0 \\ 0 & 0 & -1 & 0 \\ 0 & 0 & 0 & 1 \end{bmatrix}$ | $\begin{bmatrix} 1 & 0 & 0 & 0 \\ 0 & -1 & 0 & 0 \\ 0 & 0 & j & 0 \\ 0 & 0 & 0 & 1 \end{bmatrix}$ |

| index | 1 | 2 | 3 | 4 |
|---|---|---|---|---|
| x | $\begin{bmatrix} \mathbf{x}_{qam} \\ 0 \\ 0 \\ 0 \end{bmatrix}$ | $\begin{bmatrix} 0 \\ \mathbf{x}_{qam} \\ 0 \\ 0 \end{bmatrix}$ | $\begin{bmatrix} 0 \\ 0 \\ \mathbf{x}_{qam} \\ 0 \end{bmatrix}$ | $\begin{bmatrix} 0 \\ 0 \\ 0 \\ \mathbf{x}_{qam} \end{bmatrix}$ |

FIG. 14

1202 table (Index/x):

| Index | 1 | 2 | 3 | 4 | 5 | 6 |
|---|---|---|---|---|---|---|
| x | $\begin{bmatrix}s_1\\s_2\\0\\0\end{bmatrix}$ | $\begin{bmatrix}0\\0\\s_1\\s_2\end{bmatrix}$ | $\begin{bmatrix}s_1\\0\\s_2\\0\end{bmatrix}$ | $\begin{bmatrix}0\\s_1\\0\\s_2\end{bmatrix}$ | $\begin{bmatrix}s_1\\0\\0\\s_2\end{bmatrix}$ | $\begin{bmatrix}0\\s_1\\s_2\\0\end{bmatrix}$ |

1200 table ($x_{base}$ by $j$):

| $j$ | | | | | | | | |
|---|---|---|---|---|---|---|---|---|
| 1 | 1 | | | 2 | | 3 | 4 | |
| 2 | $\begin{bmatrix}\sqrt{2}\\0\end{bmatrix}$ | | | $\begin{bmatrix}0\\\sqrt{2}\end{bmatrix}$ | | $\begin{bmatrix}0\\-\sqrt{2}\end{bmatrix}$ | $\begin{bmatrix}-\sqrt{2}\\0\end{bmatrix}$ | |
| 3 | 1 | 2 | 3 | 4 | 5 | 6 | 7 | 8 |
|   | $\begin{bmatrix}-a_8+jb_8\\-a_8+jb_8\end{bmatrix}$ | $\begin{bmatrix}a_8+jb_8\\a_8+jb_8\end{bmatrix}$ | $\begin{bmatrix}-a_8-jb_8\\-a_8+jb_8\end{bmatrix}$ | $\begin{bmatrix}a_8-jb_8\\a_8+jb_8\end{bmatrix}$ | $\begin{bmatrix}-a_8+jb_8\\-a_8-jb_8\end{bmatrix}$ | $\begin{bmatrix}a_8+jb_8\\a_8-jb_8\end{bmatrix}$ | $\begin{bmatrix}-a_8-jb_8\\-a_8-jb_8\end{bmatrix}$ | $\begin{bmatrix}a_8-jb_8\\a_8-jb_8\end{bmatrix}$ |
| 4 | 1 | 2 | 3 | 4 | 5 | 6 | 7 | 8 |
|   | $\begin{bmatrix}1+j\\0\end{bmatrix}$ | $\begin{bmatrix}1\\j\end{bmatrix}$ | $\begin{bmatrix}1\\-j\end{bmatrix}$ | $\begin{bmatrix}1-j\\0\end{bmatrix}$ | $\begin{bmatrix}j\\1\end{bmatrix}$ | $\begin{bmatrix}0\\1+j\end{bmatrix}$ | $\begin{bmatrix}0\\1-j\end{bmatrix}$ | $\begin{bmatrix}-j\\1\end{bmatrix}$ |
|   | 9 | 10 | 11 | 12 | 13 | 14 | 15 | 16 |
|   | $\begin{bmatrix}j\\-1\end{bmatrix}$ | $\begin{bmatrix}0\\-1+j\end{bmatrix}$ | $\begin{bmatrix}0\\-1-j\end{bmatrix}$ | $\begin{bmatrix}-j\\-1\end{bmatrix}$ | $\begin{bmatrix}-1+j\\0\end{bmatrix}$ | $\begin{bmatrix}-1\\j\end{bmatrix}$ | $\begin{bmatrix}-1\\-j\end{bmatrix}$ | $\begin{bmatrix}-1-j\\0\end{bmatrix}$ |

| J | $x_{base}$ |
|---|---|
| 2 | $\frac{1}{\sqrt{2}}\begin{bmatrix} 1 & 1 \\ 1 & -1 \end{bmatrix}(1-2b)$ |
| 3 | $\sqrt{\frac{2}{3}}\begin{bmatrix} -\frac{1}{\sqrt{2}} & j & 0 \\ -\frac{1}{\sqrt{2}} & 0 & j \end{bmatrix}(1-2b)$ |
| 4 | $\frac{1}{2}\begin{bmatrix} 1 & 1 & j & j \\ 1 & -1 & j & -j \end{bmatrix}(1-2b)$ |

1300

| Index | 1 | 2 | 3 | 4 | 5 | 6 |
|---|---|---|---|---|---|---|
| x | $\begin{bmatrix} s_1 \\ s_2 \\ 0 \\ 0 \end{bmatrix}$ | $\begin{bmatrix} 0 \\ 0 \\ s_1 \\ s_2 \end{bmatrix}$ | $\begin{bmatrix} s_1 \\ 0 \\ s_2 \\ 0 \end{bmatrix}$ | $\begin{bmatrix} 0 \\ s_1 \\ 0 \\ s_2 \end{bmatrix}$ | $\begin{bmatrix} s_1 \\ 0 \\ 0 \\ s_2 \end{bmatrix}$ | $\begin{bmatrix} 0 \\ s_1 \\ s_2 \\ 0 \end{bmatrix}$ |

METHOD AND SYSTEM FOR SYMBOL SEQUENCE GENERATION AND TRANSMISSION FOR NON-ORTHOGONAL MULTIPLE ACCESS TRANSMISSION

FIELD

The application relates to systems and methods for symbol sequence generation and transmission for non-orthogonal multiple access (MA) transmission.

BACKGROUND

FIG. 1 is a high level block diagram of a proposed system for non-orthogonal MA (NoMA) uplink transmission. The system features bit level operations that include a forward error correcting block (FEC) 400, a bit level interleaver/scrambler 402, and features symbol level operations that include a modulated symbol sequence generator 404 and symbol-to-resource element (RE) mapper 406.

In the uplink, multiple access signature(s) are used at the transmitter to achieve user equipment (UE) separation, or to separate multiple streams from one UE. The receiver side (e.g. a base station) includes a multi-user detector that performs detection based on the MA signatures.

The capacity of a NoMA scheme (also referred to as the overloading capability of the scheme) is determined at least in part by the number of signatures in the MA signature codebook/pool. In different use cases, the capacity requirements vary significantly. For example, a relatively large number of UEs are active/transmit simultaneously in a massive machine-type communication (mMTC) use case while a relatively small number of UEs are active/transmit simultaneously in a ultra-reliable low latency communication (URLLC)/enhanced mobile broadband (eMBB) use case.

SUMMARY

Methods and systems are disclosed for symbol sequence generation and transmission for non-orthogonal multiple access (NoMA) transmission.

According to one embodiment, a method is provided that includes obtaining a set of input bits and generating a NoMA signal for transmission of the input bits. The NoMA signal may be generated based on: (1) a first symbol sequence, the first symbol sequence determined from the set of input bits and associated with a first MA signature within a first MA signature space; (2) a second symbol sequence determined based on the first symbol sequence, the second symbol sequence being associated with a second MA signature within a second MA signature space; and (3) a symbol-to-resource element (RE) mapping applied to the second symbol sequence to produce the NoMA signal.

In some implementations of the embodiment, the second MA signature space is larger than or equal in size to the first MA signature space in that a number of second MA signatures in the second signature space is greater than or equal to a number of first MA signatures in the first MA signature space.

In some implementations of the embodiment, the symbol-to-RE mapping is a selected one of a plurality of different sparse symbol-to-RE mappings.

In some implementations of the embodiment, the method may further include determining the second symbol sequence by applying at least one signature space modifier operation to the first symbol sequence.

In some implementations of the embodiment, applying at least one signature space modifier operation includes applying a phase rotation matrix selected from a plurality of different phase rotation matrices.

In some implementations of the embodiment, applying at least one signature space modifier operation includes applying a signature space extension matrix selected from a plurality of different signature space extension matrices.

In some implementations of the embodiment, applying at least one signature space modifier operation includes applying a phase rotation matrix selected from a plurality of different phase rotation matrices and applying a signature space extension matrix selected from a plurality of different signature space extension matrices.

In some implementations of the embodiment, the method may further include determining the first symbol sequence by at least one of: generating a QAM symbol based on the set of input bits, and repeating the QAM symbol K times; generating a multi-dimensional symbol c of size $K_1$ based on the set of input bits; generating a multi-dimensional symbol c of size $K_1$ based on the set of input bits and repeating c by $K_2$ times where $K=K_1*K_2$ and $K_1$ is an integer number between 2 and K; generating a symbol sequence c of size $K_1$ by non-linear spreading where a relationship between the symbols in the symbol sequence c is input bit dependent; generating a symbol sequence c of size $K_1$ by non-linear spreading where a relationship between the symbols in the symbol sequence c is input bit dependent, and repeating c by $K_2$ times where $K=K_1*K_2$ and $K_1$ is an integer number between 2 and K; generating a symbol sequence c of size $K_1$ by linear spreading where a relationship between the symbols in the symbol sequence is not dependent on the input bits; generating a symbol sequence c of size $K_1$ by linear spreading where a relationship between the symbols in the symbol sequence is not dependent on the input bits, and repeating c by $K_2$ times where $K=K_1*K_2$; generating a symbol sequence $c_1$ of size $K_1$ containing independent QAM symbols with $K>=K_1>=2$; generating a symbol sequence $c_1$ of size $K_1$ containing independent QAM symbols with $K>=K_1>=2$, and repeating the symbol sequence $c_1$ by $K_2$ times where $K=K_1*K_2$ and $K_1$ is an integer number between 2 and K; multiplying the inputs set of bits by a spreading matrix; and applying symbol dependent, linear or non-linear spreading to the set of input bits.

In some implementations of the embodiment, applying a signature space extension matrix selected from a plurality of different signature space extension matrices includes applying a signature space extension matrix selected from a pool of available K×K signature space extension matrices, wherein for each signature space extension matrix in the pool: the diagonal elements are taken from a specified alphabet; or the diagonal elements are taken from an alphabet that consists of constant-amplitude complex numbers; or the diagonal elements are taken from Zadoff-Chu (ZC) sequences of length K with different roots; or the diagonal elements are taken from sequences of length K by Grassmannian signatures; or the diagonal elements are taken from sequences, with cross-correlation between any pair of sequences less than a given threshold.

In some implementations of the embodiment, the method may further include using a combined signature space extension matrix and symbol-to-RE mapping that introduces sparsity.

In some implementations of the embodiment, the first symbol sequence is sparse. The method may further include generating the sparse first symbol sequence of length K containing N non-zero elements. Generating the sparse first symbol sequence may include using one of a pool of sparsity patterns. In some implementations of the embodiment, each sparsity pattern has an associated index, and the method further includes using the index to select the sparsity pattern.

In some implementations of the embodiment, the method further includes receiving signaling that conveys one or more characteristics of the first symbol sequence based on one or a combination of: RRC signaling; downlink control information (DCI); implicit based on signaling that indicates a modulation and coding scheme (MCS).

In some implementations of the embodiment, a pool for at least one signature space modifier operation is based on one or a combination of: an average traffic load; a PAPR performance; a receiver capability; an application type; a key performance indicator (KPI); by a network and communicated to the UEs through RRC signaling, DCI signaling, MAC CE (control element) or a combination thereof.

In some implementations of the embodiment, the method further includes applying a sparsity pattern as part of generating the first symbol sequence, or as part of generating the second symbol sequence or as part of the symbol-to-RE mapping. The method may further include determining an index for one or a combination of: a sparsity pattern index; a phase rotation matrix index for use in modifying the first MA signature space; and a signature space extension matrix for use in modifying the first MA signature space.

In some implementations of the embodiment, the method may further include generating the NoMA signal to contain a plurality of data streams, each having an associated respective MA signature from within the second signature space.

In some implementations of the embodiment, the method may further include determining to transmit a second NoMA signal, applying a symbol-to-RE mapping to the first symbol sequence to produce the second NoMA signal, and transmitting the second NoMA signal.

In some implementations of the embodiment, the method may further include receiving signaling indicating whether to transmit the NoMA signal or the second NoMA signal.

In some implementations of the embodiment, the first NoMA signal is transmitted in a first mode of operation and the second NoMA signal is transmitted in a second mode of operation.

In another embodiment, there is provided a UE. The UE includes a NoMA signal generator to generate a NoMA signal that transmits input bits, and a transmitter to transmit the NoMA signal. The NoMA signal generator may generate the NoMA signal based on: a first symbol sequence, the first symbol sequence determined from the set of input bits and associated with a first MA signature within a first MA signature space; a second symbol sequence determined based on the first symbol sequence, the second symbol sequence being associated with a second MA signature within a second MA signature space; and a symbol-to-resource element (RE) mapping applied to the second symbol sequence to produce the NoMA signal.

In some implementations of the embodiment, the second MA signature space is larger than or equal in size to the first MA signature space in that a number of second MA signatures in the second signature space is greater than or equal to a number of first MA signatures in the first MA signature space.

In some implementations of the embodiment, the symbol-to-RE mapping is a selected one of a plurality of different sparse symbol-to-RE mappings.

In some implementations of the embodiment, the NoMA signal generator is further to: determine the second symbol sequence by applying at least one signature space modifier operation to the first symbol sequence.

In some implementations of the embodiment, applying at least one signature space modifier operation includes applying a signature space extension matrix selected from a plurality of different signature space extension matrices.

In some implementations of the embodiment, applying at least one signature space modifier operation includes applying a phase rotation matrix selected from a plurality of different phase rotation matrices and applying a signature space extension matrix selected from a plurality of different signature space extension matrices.

In some implementations of the embodiment, the NoMA signal generator is further to determine the first symbol sequence by at least one of: generating a QAM symbol based on the set of input bits, and repeating the QAM symbol K times; generating a multi-dimensional symbol c of size $K_1$ based on the set of input bits; generating a multi-dimensional symbol c of size $K_1$ based on the set of input bits and repeating c by $K_2$ times where $K=K_1*K_2$ and $K_1$ is an integer number between 2 and K; generating a symbol sequence c of size $K_1$ by non-linear spreading where a relationship between the symbols in the symbol sequence c is input bit dependent; generating a symbol sequence c of size $K_1$ by non-linear spreading where a relationship between the symbols in the symbol sequence c is input bit dependent, and repeating c by $K_2$ times where $K=K_1*K_2$ and $K_1$ is an integer number between 2 and K; generating a symbol sequence c of size $K_1$ by linear spreading where a relationship between the symbols in the symbol sequence is not dependent on the input bits; generating a symbol sequence c of size $K_1$ by linear spreading where a relationship between the symbols in the symbol sequence is not dependent on the input bits, and repeating c by $K_2$ times where $K=K_1*K_2$; generating a symbol sequence $c_1$ of size $K_1$ containing independent QAM symbols with $K>=K_1>=2$; generating a symbol sequence $c_1$ of size $K_1$ containing independent QAM symbols with $K>=K_1>=2$, and repeating the symbol sequence $c_1$ by $K_2$ times where $K=K_1*K_2$ and $K_1$ is an integer number between 2 and K; multiplying the inputs set of bits by a spreading matrix; and applying symbol dependent, linear or non-linear spreading to the set of input bits.

In some implementations of the embodiment, applying a signature space extension matrix selected from a plurality of different signature space extension matrices includes applying a signature space extension matrix selected from a pool of available K×K signature space extension matrices, wherein for each signature space extension matrix in the pool: the diagonal elements are taken from a specified alphabet; or the diagonal elements are taken from an alphabet that consists of constant-amplitude complex numbers; or the diagonal elements are taken from Zadoff-Chu (ZC) sequences of length K with different roots; or the diagonal elements are taken from sequences of length K by Grassmannian signatures; or the diagonal elements are taken from sequences, with cross-correlation between any pair of sequences less than a given threshold.

In some implementations of the embodiment, the NoMA signal generator is further to: apply a sparsity pattern as part of generating the first symbol sequence, or as part of generating the second symbol sequence or as part of the symbol-to-RE mapping.

In some implementations of the embodiment, the NoMA signal generator is further to determine an index for one or a combination of: a sparsity pattern index; a phase rotation matrix index for use in modifying the first MA signature space; and a signature space extension matrix for use in modifying the first MA signature space.

In some implementations of the embodiment, the NoMA signal generator is further to: generate the NoMA signal to contain a plurality of data streams, each having an associated respective MA signature from within the second signature space.

In some implementations of the embodiment, the UE includes circuitry to: determine to transmit a second NoMA signal; apply a symbol-to-RE mapping to the first symbol sequence to produce the second NoMA signal; and transmit the second NoMA signal.

In some implementations of the embodiment, the UE includes a receiver to receive signaling indicating whether to transmit the NoMA signal or the second NoMA signal.

In another embodiment, there is provided a method performed on the network side, e.g. by a base station. The method includes transmitting, to a UE, an indication of an MA signature configuration. The MA signature configuration may be determined by the base station, e.g. based on information received from the UE. The indication may indicate parameters that configure a NoMA signal generator at a UE, e.g. parameters $i_1$, and/or $i_2$, and/or $i_3$ described later. The method may further include receiving a NoMA signal from the UE, the NoMA signal having been generated in accordance with the MA signature configuration.

In another embodiment, there is provided a base station including a transmitter to transmit to the UE the indication of the MA signature configuration, and a receiver to receive a NoMA signal from the UE, the NoMA signal having been generated in accordance with the MA signature configuration. A control system may generate the indication of the MA signature configuration.

BRIEF DESCRIPTION OF THE DRAWINGS

Embodiments of the disclosure will now be described with reference to the attached drawings in which:

FIG. 8 depicts a table showing generation of a first symbol sequence by applying two-dimensional modulation.

FIG. 9 depicts a table showing generation of a first symbol sequence by applying a spreading matrix.

FIG. 10A depicts a table showing an example of a set of four signature space extension matrices.

FIG. 10B depicts a table showing an example of a set of sixteen signature space extension matrices.

FIG. 11 depicts a table showing an example of a set of sixteen signature space extension matrices using Zadoff-Chu Sequences of length 4.

FIG. 14 depicts a table showing generation of a first symbol sequence based on sparse code MA codebooks.

FIG. 15 depicts a table showing generation of a final symbol sequence by incorporating a sparsity pattern on top of a generated first symbol sequence.

DETAILED DESCRIPTION

Figure 1:
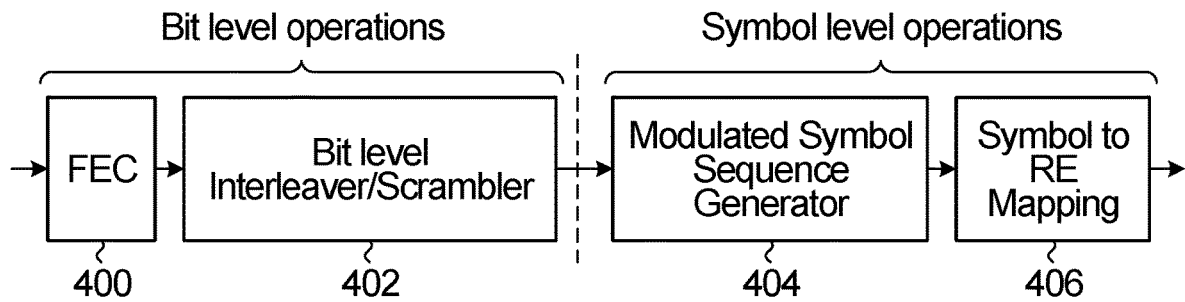
FIG. 1 depicts a block diagram of a proposed system for NoMA transmission.

Generally, embodiments of the present disclosure provide a method and system for the symbol sequence generation and transmission for non-orthogonal multiple access transmission. For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Multiple access (MA) techniques generally allow multiple signals to be transmitted from one or more transmitters to one or more receivers simultaneously on a given shared resource. The shared resource may include a time resource, a frequency resource, a space resource or some combination thereof. In a downlink (DL) scenario, a network side device such as a transmit receive point (TRP), also sometimes known as a transmit point (TP), a receive point (RP), an evolved Node B (eNode B or eNB), or an access point, can transmit to multiple separate user equipment (UE). In an uplink (UL) scenario, multiple UEs can transmit to a network side receiver.

Existing schemes for generating and transmitting NoMA signals are inflexible in terms of their overloading capability. There is a need for a system and method for NoMA signal generation that provides such flexibility. For example, it may be advantageous to have a unified framework that can cater to different overloading requirements of different use case scenarios, such as, but not limited to URLLC, eMMB, mMTC etc., and in particular it would be advantageous if the framework could be adjusted adaptively. It may also be advantageous to have a unified framework for detailed implementation of the modulated symbol sequence generator and symbol to RE mapping component blocks that provide flexible overloading capability. It may also be advantageous to have a method for generating NoMA signals that provides an improvement in peak average power ratio (PAPR).

While the detailed embodiments focus on uplink NoMA transmission using MA signatures, the same approaches can be used for downlink transmission. In an example downlink scenario, a MA signal is generated at the base station, for example, based on the information received from UEs, a number of UEs being served or information from other base stations. The base station may inform the UE of a signature association and relevant change in the signature association, and/or switch on/off an extension and associated extension indices through signaling, as described for the uplink embodiments. Such information helps the UE to switch to or otherwise activate a proper reception mode and facilitate/reduce the complexity of the decoding process.

Devices (e.g. BS, UE) configured to transmit data may use or be assigned different signatures to help a receiver discriminate their transmissions. When different signatures are used, different bit and/or symbol sequences may be generated from the same set of input bits. In that sense, a signature assigned to a device becomes associated with and/or uniquely identifies the particular set of bit or symbol sequences produced by that device. The signature may alternatively be associated with and/or uniquely identify the particular bit domain or symbol domain (or combination of bit and symbol domain) operation(s) used by a device to produce its bit/symbol sequences. The signature may also be alternatively associated with and/or uniquely identify the particular module(s)/generator(s) (in bit domain or symbol domain or combination thereof) used to produce bit/symbol sequences. Other terms and meanings include:

- a signature space: a set/a pool of possible signatures;
- modifying a signature space means modifying the pool of available signatures. This can include:
- extending the number of available signatures to produce a larger signature space; and/or
- modifying the signature space to achieve some other objective. Examples are provided below.

Figure 2:
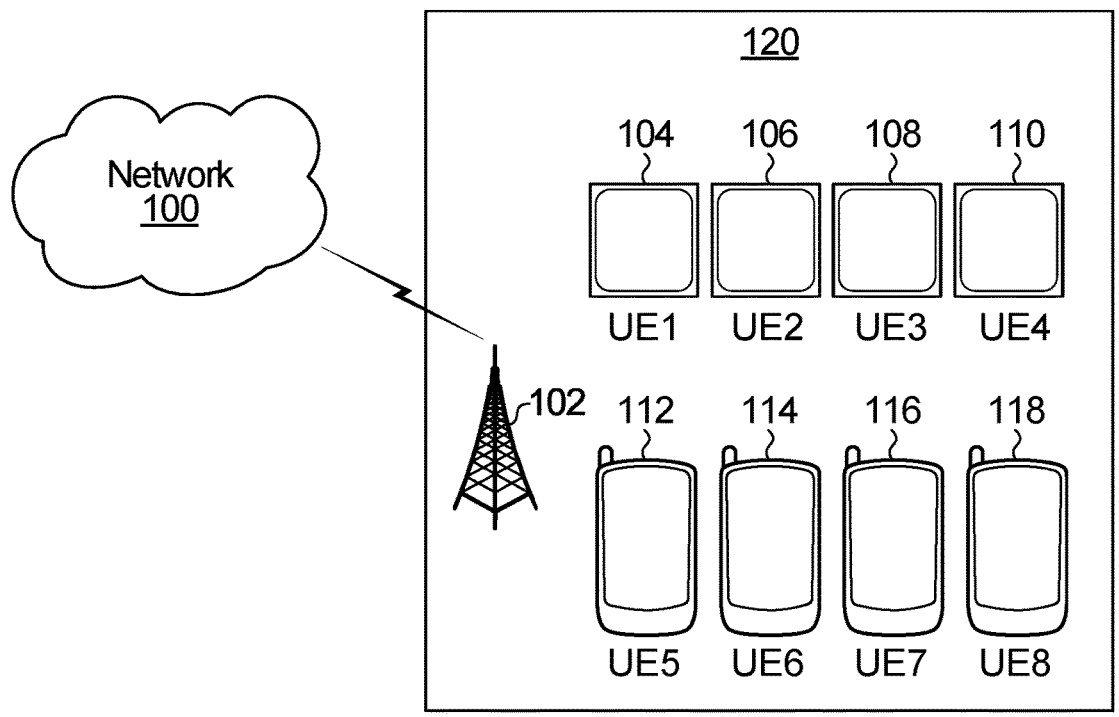
FIG. 2 is a block diagram of a network within which embodiments of the invention may be implemented.

Referring to FIG. 2, a schematic diagram of a network 100 is shown. A base station (BS) 102 provides uplink and downlink communication with the network 100 for a plurality of UEs 104-118 within a coverage area 120 of the BS 102. The UEs may transmit different types of traffic. In a specific example, the UEs 104-110 may employ orthogonal frequency division multiplexing (OFDM) to transmit URLLC traffic, and UEs 112-118 transmit eMBB traffic. UEs 112-118 may also use OFDM. The BS 102 may, for example, be an access point. The described functions of the BS 102 may also be performed by multiple base stations using synchronous downlink transmission. FIG. 1 shows one BS 102 and eight UEs 104-118 for illustrative purposes, however there may be more than one BS 102 and the coverage area 120 of the BS 102 may include more or fewer than eight UEs 104-118 in communication with the BS 102.

For the same or different types of traffic (e.g. massive Machine Type Communications or mMTC), UEs 104-118 may use non-orthogonal multiple access (NoMA) for uplink transmissions. A non-limiting set of NoMA examples includes sparse code multiple access (SCMA), interleave-grid multiple access (IGMA), multi-user shared access (MUSA), low code rate spreading, frequency domain spreading, non-orthogonal coded multiple access (NCMA), pattern division multiple access (PDMA), resource spread multiple access (RSMA), low density spreading with signature vector extension (LDS-SVE), low code rate and signature based shared access (LSSA), non-orthogonal coded access (NOCA), interleave division multiple access (IDMA), repetition division multiple access (RDMA), or group orthogonal coded access (GOCA). Depending upon the multiple access method used, the MA signature may take different forms. The MA signature may relate to the specific format used for the multiple access method. For example, if SCMA is used, then the MA signature for the uplink transmission may be based on an SCMA codebook used for the uplink transmission. As another example, if IGMA is used, then the MA signature for the uplink transmission may be based on the IGMA's signature, interleaving pattern or grid mapping used for the uplink transmission. IGMA may also use an interleaving and grid mapping pattern together to define a signature.

The present disclosure will now be described with respect to example embodiments for uplink transmissions. The disclosure may be applied to standards compliant communications systems, such as those that are compliant with Third Generation Partnership Project (3GPP), IEEE 802.11, and the like, technical standards, as well as non-standards compliant communications systems. Generally, the principles described herein may be applied to any system or network that is configured to allow multiple devices, users, or UEs to share certain transmission resources either in the uplink or downlink e.g. using non-orthogonal or multiple access communications.

Figure 3:
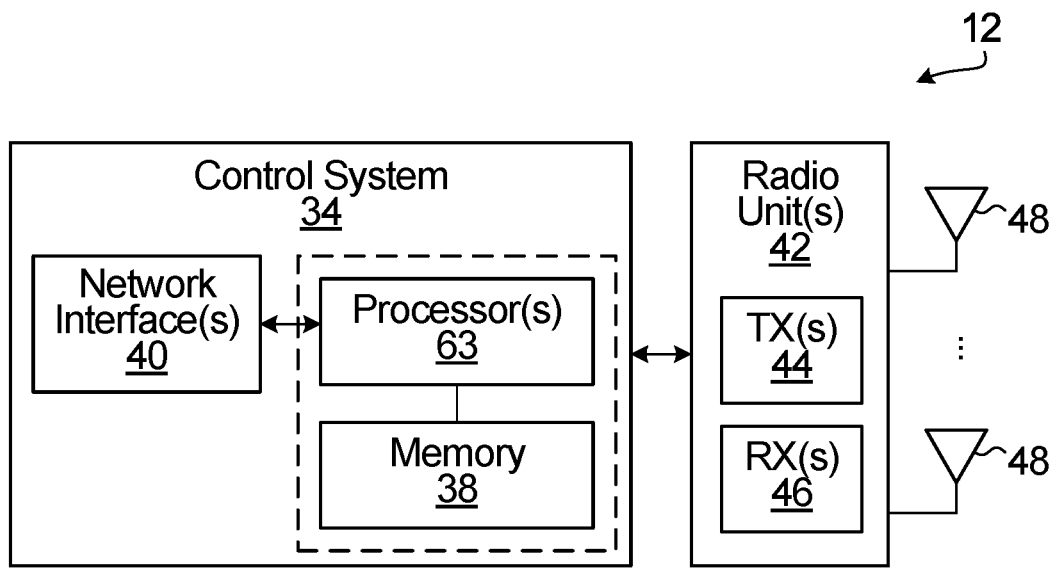
FIG. 3 is a block diagram of a base station within which embodiments of the invention may be implemented.

FIG. 3 is a schematic block diagram of a BS 12 according to some embodiments of the present disclosure. As illustrated, the BS 12 includes a control system 34 configured to perform the functions and/or embodiments described herein (e.g. as shown in FIGS. 5A-19). In some implementations, the control system 34 is in the form of circuitry configured to perform the functions and/or embodiments described herein. In yet other implementations, the control system or circuitry 34 includes one or more processors 36 (e.g., CPUs, ASICs, FPGAs, and/or the like) and memory 38 and optionally a network interface 40. The BS 12 also includes one or more radio units 42 that each includes one or more transmitters 44 and one or more receivers 46 coupled to one or more antennas 48. In some implementations, the BS 12 does not include radio units 42 but is configured to interface with a separate transmission module. For example, some of all of the functionality and/or embodiments described herein may be implemented in hardware or circuitry such as processors 36 and memory 38 (e.g. in one or more chipsets, microprocessors, application-specific integrated circuits (ASIC), field-programmable gate arrays (FPGAs), dedicated logic circuitry, or combinations thereof) so as to produce NoMA signals as described herein for transmission by a separate (RF) unit. In some other implementations, the functionality of the BS 12 described herein may be fully or partially implemented in software or modules that is, e.g., stored in the memory 38 and executed by the processor(s) 36.

In yet other implementations, a computer program including instructions which, when executed by at least one processor, causes the at least one processor to carry out the functionality of the BS 12 according to any of the embodiments described herein is provided. In yet other implementations, a carrier containing the aforementioned computer program product is provided. The carrier is one of an electronic signal, an optical signal, a radio signal, or a computer readable storage medium (e.g., a non-transitory computer readable medium such as memory).

Figure 4:
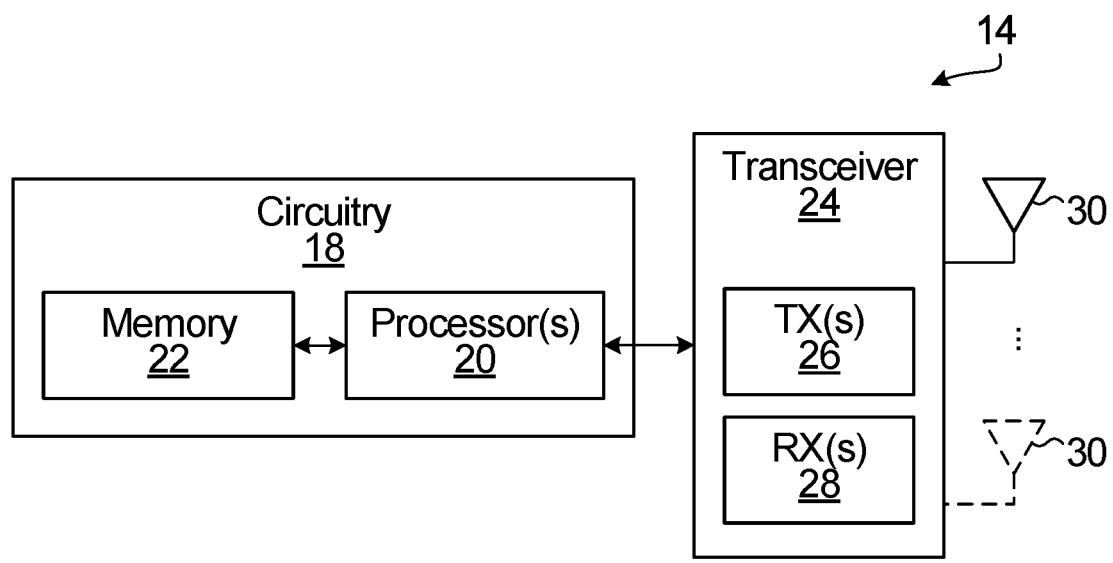
FIG. 4 is a block diagram of a wireless device within which embodiments of the invention may be implemented.

FIG. 4 is a schematic block diagram of the wireless device 14 (e.g. UEs 104-118) according to some embodiments of the present disclosure. Wireless device 14 is also referred to as a UE herein. As illustrated, the wireless device 14 includes circuitry 18 configured to perform the functions and/or embodiments described herein (e.g. as shown in FIGS. 5A-19). In some implementations, the circuitry 18 includes one or more processors 20 (e.g., Central Processing Units (CPUs), Application Specific Integrated Circuits (ASICs), Field Programmable Gate Arrays (FPGAs), and/or the like) and memory 22. The wireless device 14 also includes one or more transceivers 24 each including one or more transmitter 26 and one or more receivers 28 coupled to one or more antennas 30. In some implementations, the wireless device 14 does not include transceivers 24 but is configured to interface with a separate transmission module. For example, some of all of the functionality and/or embodiments described herein may be implemented in hardware or circuitry such as circuitry 18 (e.g. in one or more chipsets, microprocessors, application-specific integrated circuits (ASIC), field-programmable gate arrays (FPGAs), dedicated logic circuitry, or combinations thereof) so as to produce NoMA signals as described herein for transmission by a separate (RF) unit. In some other implementations, the functionality of the wireless device 14 described herein may be fully or partially implemented in software or modules that is, e.g., stored in the memory 22 and executed by the processor(s) 20.

In yet other implementations, a computer program including instructions which, when executed by at least one processor, causes the at least one processor to carry out the functionality of the wireless device 14 according to any of the embodiments described herein is provided. In yet other implementations, a carrier containing the aforementioned computer program product is provided. The carrier is one of an electronic signal, an optical signal, a radio signal, or a computer readable storage medium (e.g., a non-transitory computer readable medium such as memory).

Figure 5A:
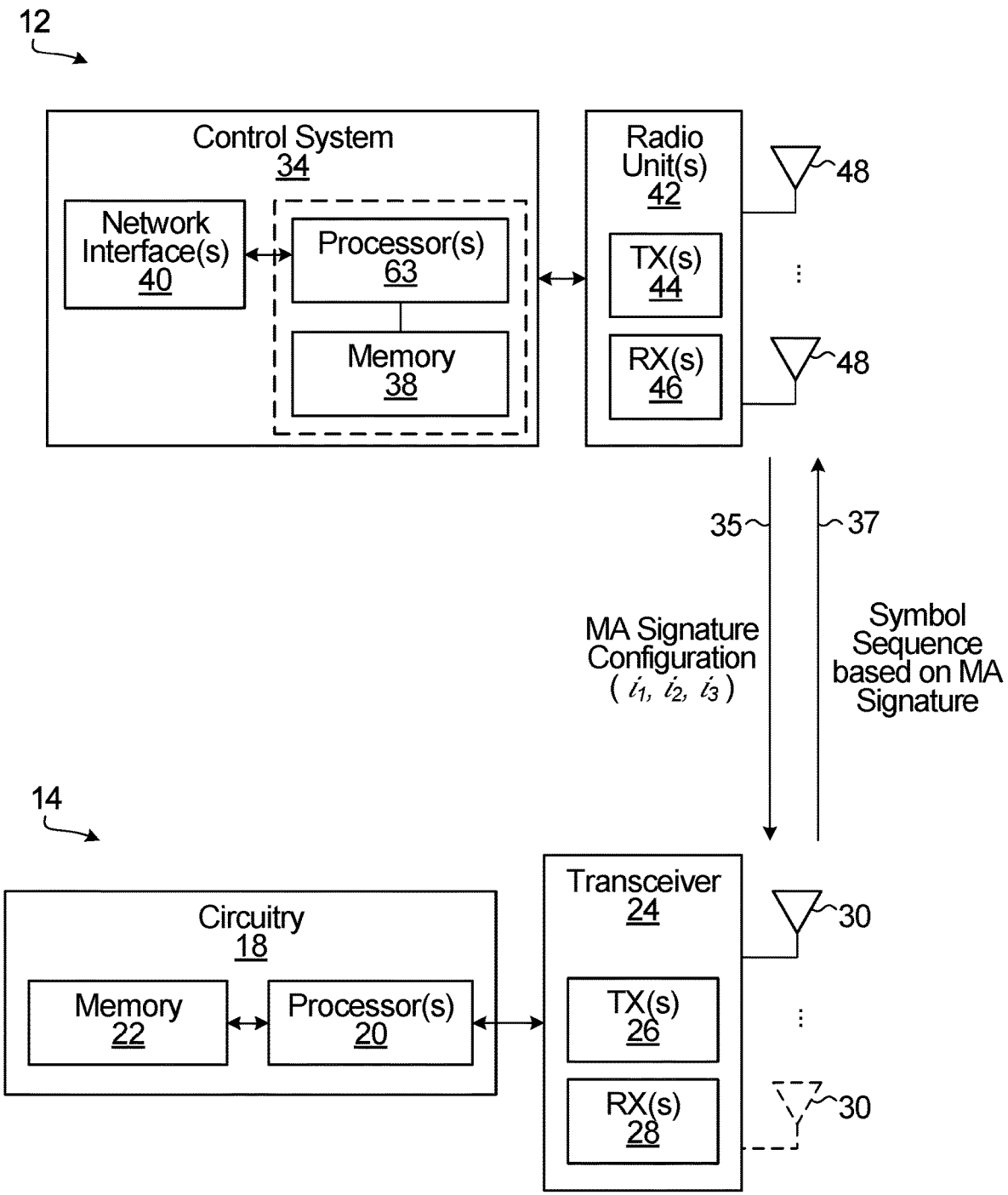
FIG. 5A is a block diagram of a system within which embodiments of the invention may be implemented for uplink transmission.

FIG. 5A is a system view including both the base station 12 of FIG. 3 and the wireless device 14 of FIG. 4. The wireless device 14 is configured to transmit a symbol sequence 37 associated with a MA signature. Detailed embodiments are described below for how this symbol sequence is generated. In some embodiments, the base station 12 is configured to transmit signaling 35, which may be explicit, or implicit, that indicates an MA signature configuration to the wireless device. Such signaling may be separately transmitted to each wireless device (e.g. via an RRC message) or concurrently to multiple wireless devices (e.g. via a broadcast, multicast or a group DCI message), to configure the wireless devices with MA signatures. Many detailed examples are provided below. The signaling may include one or more of the parameters $i_1$, $i_2$ and $i_3$, again all discussed below. In this case, the wireless device 14 transmits the symbol sequence 37 based on an MA signature configured based on the received signaling. Alternatively, in some embodiments the UE determines its MA signature on its own, for example based on measurements. The base station 12 can then separate the transmissions of different wireless devices with the assistance of their MA signatures. While the MA signature helps/facilitate decoding, there can be other things that may also help decoding. In some embodiments, on the uplink every UE channel is almost independent and knowing channel coefficients/gains may be sufficient to separate the UEs. In some cases, this may not be true/sufficient hence the need for signature based NOMA signals.

Figure 5B:
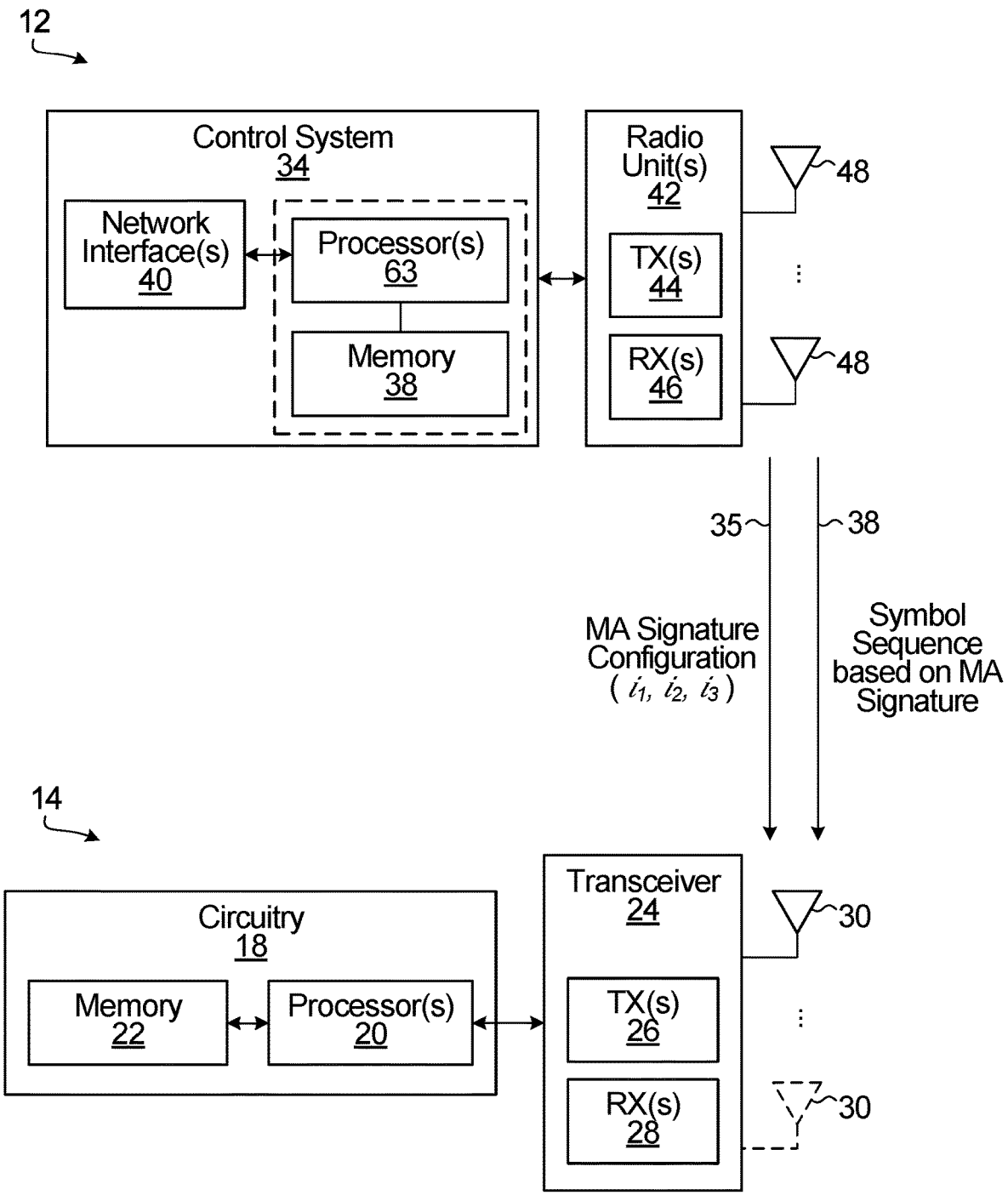
FIG. 5B is a block diagram of a system within which embodiments of the invention may be implemented for downlink transmission.

FIG. 5B is another system view showing the base station 12 and wireless device 14. In this embodiment, in contrast to the embodiment of FIG. 5A where the UE transmits an uplink transmission 37 containing a symbol sequence based on the MA signature, the base station 12 transmits a downlink transmission 38 containing a symbol sequence based on the MA signature. In another embodiment, a system performs both uplink and downlink transmissions using the determined MA signature, or using different respective determined MA signatures.

Figure 6:
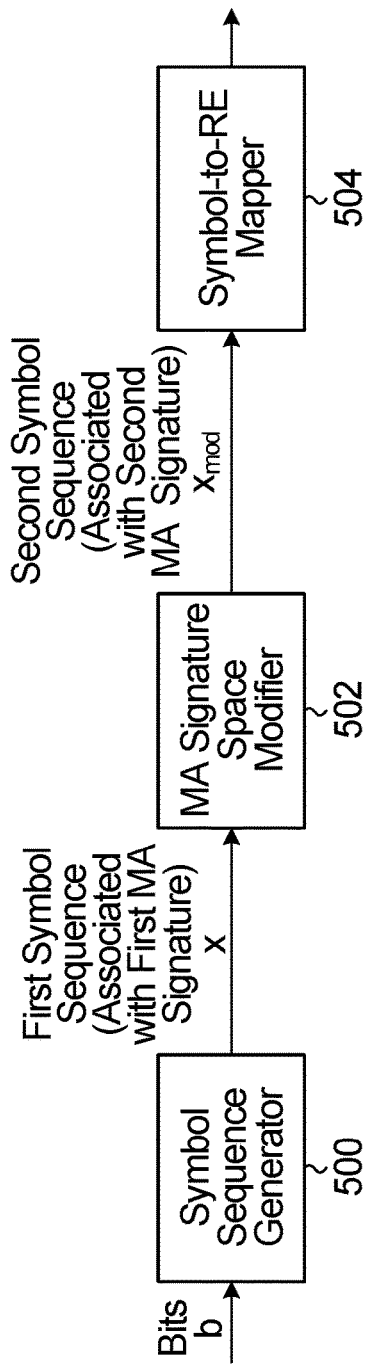
FIG. 6 depicts a block diagram of a NoMA signal generator comprised of a symbol sequence generator, a MA signature space modifier, and a symbol-to-RE mapper.

Referring to FIG. 6, shown is a block diagram of a NoMA signal generator provided by an embodiment of the invention. This and other embodiments described below may, for example, be implemented as part of a base station such as the base station 12 of FIG. 3 or a wireless device, such as the wireless device 14 of FIG. 4. Shown is a first symbol sequence generator 500 that determines a first symbol sequence x determined from a set of input bits b. The first symbol sequence is associated with a first MA signature within a first MA signature space. Also shown an MA signature space modifier 502 that determines a second symbol sequence $x_{mod}$ based on the first symbol sequence. In some embodiments, the second symbol sequence is associated with a second MA signature within a second MA signature space, wherein the second MA signature space is larger than or equal to the first MA signature space in that a number of second MA signatures in the second signature space is greater than or equal to a number of first MA signatures in the first MA signature space. In some embodiments, there are multiple MA signature space modifiers, each of which modifies the signature space. Two specific examples of MA signature space modifiers include a phase rotation matrix (selected or allocated) from a pool of phase rotation matrices, and a signature space extension matrix (selected or allocated) from a pool of signature space extension matrices). Detailed embodiments featuring these specific examples are described below.

Also shown is a symbol-to-resource element (RE) mapper 504 that applies a symbol-to-RE mapping to the second symbol sequence to produce the NOMA signal.

The first symbol sequence x is a sequence of length K belonging to the first symbol sequence space which contains all possible first symbol sequences. In some of the detailed examples below, K=4, but other values are possible. The second symbol sequence $x_{mod}$ belongs to the second signature space which contains all possible second symbol sequences. In some embodiments, the second sequence is also of length K. In other embodiments, the second symbol sequence has a length greater than K. For example, the base station may decide to increase or extend the length of the sequence to increase the sparsity (i.e., less collision among transmissions and less interference), to reduce decoding computational complexity or delay. As noted above, in some embodiments, the size of the second symbol sequence space is the same as that of the first symbol sequence space. In some embodiments, the size of the second symbol sequence space is larger than that of the first symbol sequence space.

Whether the second symbol sequence space is the same size as, or larger than, the first symbol sequence space depends upon the purpose of the MA signature space modifier. Various detailed examples are provided below. In some embodiments, the signature space modifier 502 is adjusted adaptively to suit a particular transmission type, environment and/or use case (e.g. mMTC), to improve PAPR, enhance transmission separation at the receiver, or reduce receiver complexity. The second symbol sequence $x_{mod}$ is then input to the symbol-to-RE mapper 504.

In some other embodiments, signature space modifier 502 is adjusted adaptively to mitigate the interference caused by the other UEs within the coverage area of a BS. In some embodiments, signature space modifier 502 is adjusted adaptively to mitigate the interference caused by the other UEs in the coverage area of neighbor BSs. In some embodiments, signature space modifier 502 of a UE is adjusted adaptively to mitigate the interference caused by the cell-edge UEs in the coverage area of neighbor BSs (i.e., UEs at the edge of the coverage area of a BS where signal reception from the serving BS is weak).

In yet other embodiments, signature space modifier 502 is adaptively activated or switched on to modify (e.g. extend) the signature space when needed. For example, the activation may be based on one or more parameters or may be performed when certain conditions occurs, for example, when an interference level or other metric indicative of a channel quality (e.g. as measured by the UE 14 or BS 12)) does not meet a predetermined target requirement or value, or when a number of UEs present in a cell or network is greater than a particular number of UEs (e.g. as indicated or signaled by the BS 12). Conversely, signature space modifier 502 may be deactivated or switched off when not needed. For example, the deactivation may be based on one or more parameters or may be performed when certain conditions occurs, for example, when the channel quality metric indication meets the target requirement or value or when the number of UEs present in a cell or network falls below a particular number of UEs. The activation/deactivation may be performed autonomously by the device implementing the NoMA signal generator (e.g. UE 14) or based on one or more parameters signaled or indicated by another device (e.g. BS 12). Examples of parameters signaled to a UE include one or more values for $i_1$, $i_2$, $i_3$, which are MA signature index(ices) (for example, representing one or a combination of a sparsity pattern index, phase rotation matrix index, and signature space extension matrix index). These are explained below in greater detail.

The symbol-to-RE mapper 504 maps each symbol of the second symbol sequence $x_{mod}$ to a respective resource element. A resource element may be one element in a time frequency grid. In one embodiment, one resource element is an OFDM (orthogonal frequency division multiplex) sub-carrier (in frequency) for one OFDM symbol duration (in time).

In some embodiments, sparsity is introduced in the symbol sequence generator 500, or the MA signature space modifier 502 or the symbol-to-RE mapper 504.

Sparsity may also be introduced elsewhere, as described below for other embodiments. In general, the introduction of sparsity means that the output includes some zero elements. The use of sparsity can further enlarge the number of possible MA signatures. In some embodiments, no sparsity is introduced.

Generation of a sparse symbol sequence means generating a set of symbols where at least one of the symbols represents nullity/zero/nil. The nullity/zero/nil symbol is indicated/represented by a state of the resource(s). For example, zero constellation point (i.e., a constellation symbol with zero power) may represent the zero/nullity/nil. Physical or logical resources such as frequency, time, antenna ports, antenna elements, sub-carriers, REs, beams, frequency bands etc. may be used.

Alternatively, a sparse symbol sequence can be generated by puncturing. At first, a non-sparse symbol sequence of length K is generated and K−N (>=1) elements are punctured/pruned based on the sparse pattern to produce a desired sparse symbol sequence of length K.

Alternatively, sparsity can be produced by padding the nullity/zero symbol(s) to a sequence of symbols and performing symbol level interleaving and/or scrambling. Other methods/possibilities of generating the sparsity symbol sequences are not precluded.

Figure 7:
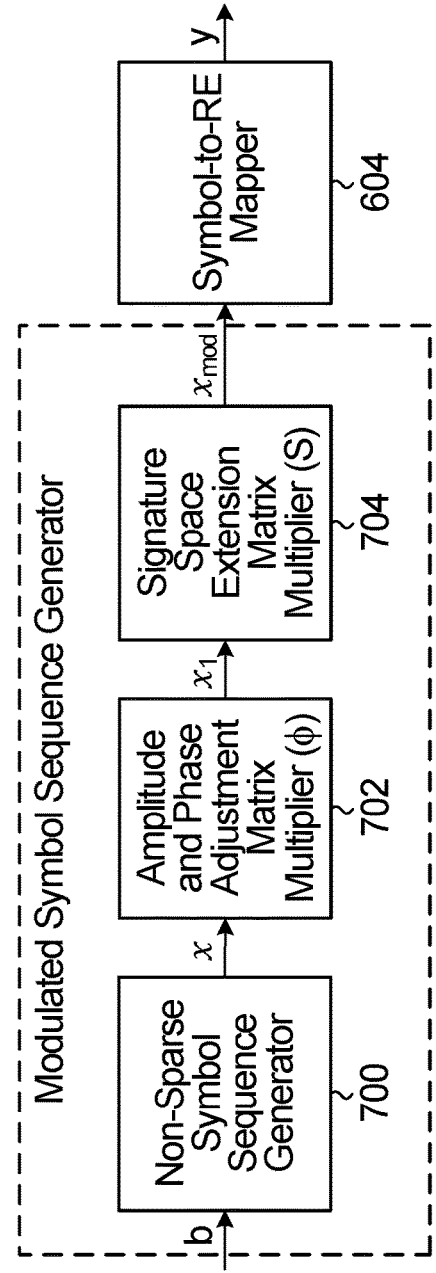
FIG. 7 depicts a block diagram of a modulated symbol sequence generator comprised of a non-sparse symbol sequence generator, an amplitude and phase adjustment matrix multiplier, and a signature space extension matrix multiplier.

FIG. 7 is a specific embodiment of a modulated symbol sequence generator provided by an embodiment of the invention. In the example of FIG. 7, there is a non-sparse first symbol sequence generator 700, and there are two signature space modifiers, including a first 702 which is an amplitude and phase adjustment matrix (φ) multiplier, and a second 704 which is a signature space extension matrix (S) multiplier. In some embodiments, only amplitude and phase adjustment matrix (φ) multiplier 702 or signature space extension matrix (S) multiplier 704 is used. In some other embodiments, both amplitude and phase adjustment matrix (φ) multiplier 702 and signature space extension matrix (S) multiplier 704 are used.

The amplitude and phase adjustment matrix multiplier 702 is an example of a signature space extender in that it can be used to extend the size of a signature space. In the amplitude and phase adjustment multiplier 702, a selected amplitude and phase adjustment matrix φ (selected from a pool of possible such matrices) is applied to the first symbol sequence x to generate the symbol sequence $x_1 = \Phi x$. The signature space extension matrix multiplier 704 is another example of a signature space extender. In the signature space extension matrix multiplier 704, a selected signature space extension matrix S (selected from a pool of such matrices) is applied to the output of the amplitude and phase adjustment matrix multiplier 702 to generate the final symbol sequence $x_{mod} = S x_1$. In some other embodiments, phase adjustment matrix multiplier 702 and/or signature space extension matrix multiplier 704 modifies the interference caused to the other UEs within the coverage area of the same BS. In some embodiments, phase adjustment matrix multiplier 702 and/or signature space extension matrix multiplier 704 modifies the interference caused to the other UEs in the coverage area of neighbor BSs. In some embodiments, phase adjustment matrix multiplier 702 and/or signature space extension matrix multiplier 704 modifies the interference caused to the cell-edge UEs in the coverage area of neighbor BSs. The output is then mapped to the available resource elements by the symbol-to-RE mapper 604.

In this embodiment, an MA signature corresponding to symbol sequence generator block is determined from phase rotation matrix Φ and also signature space extension matrix (S) based on which entry on the respective pool is selected for each one. The output of signature space extension matrix multiplier 704 is a symbol sequence associated with the second MA signature space.

As noted above, for this embodiment, the input sequence x is non-sparse. However, the output of the signature space extension multiplier 704 may or may not be sparse. In some embodiments, sparsity is introduced in the symbol-to-RE mapper 604. In some embodiments, sparsity is introduced by phase adjustment matrix multiplier 702 and/or signature space extension matrix multiplier 704. In some embodiments, the output may be directly mapped to physical resources (in which case the functionality of the symbol space extension matrix multiplier and the symbol-to-RE mapper are combined in one operation). Alternatively, the physical resource mapping may be done separately, as depicted in FIG. 7.

In this embodiment, the MA signature is defined by the combination of the selected amplitude and phase adjustment matrix Φ and the selected signature space extension matrix S. Different choices for Φ and S may be made that help with one or a combination of:

peak average power ratio (PAPR) performance;
signature pool size enlargement;
multi user detection performance enhancement;
receiver complexity reduction;
mitigation of the interference caused by/to the other UEs within the coverage area of the same BS;
mitigation of the interference caused by/to the other UEs in the coverage area of neighbor BSs;
mitigation of the interference caused by/to the cell-edge UEs in the coverage area of a BS.

For some of the examples above, the size of the signature space is not necessarily expanded.

Non-Sparse First Symbol Sequence Generation

In a first example of non-sparse first symbol sequence generation, where the length of the first symbol sequence is to be K, the first symbol sequence generator generates a QAM symbol based on the input b, and repeats the QAM symbol K times. Any suitable QAM modulation scheme can be employed. The QAM symbols may be generated, for example using modulations such as BPSK, QPSK, 16QAM, 64QAM, 256QAM and 1024QAM. This first symbol sequence of length K is associated with a first MA signature within a first MA signature space where the size of the MA signature space is 1.

In a second example of non-sparse first symbol sequence generation, the first symbol sequence generator generates a multi-dimensional symbol c of size $K_1$ and optionally repeats c by $K_2$ times where $K=K_1*K_2$ and $K_1$ is an integer number between 2 and K. A sequence of symbols whose length is more than one can be considered a multi-dimensional symbol. The multi-dimensional symbol c can, for example, be obtained based on the non-zero components of a sparse code MA (SCMA) codebook.

In a third example of non-sparse first symbol sequence generation, the first symbol sequence generator generates a symbol sequence c of size $K_1$ by non-linear spreading where the relationship between the symbols in the symbol sequence c is input bit dependent. The symbol sequence c is optionally repeated by $K_2$ times where $K=K_1*K_2$ and $K_1$ is an integer number between 2 and K.

An example of generation of the first symbol sequence by applying multi-dimensional modulation will now be described with reference to FIG. 8. For the examples of FIG. 8, the multi-dimensional constellations have $K_1=2$ dimensions. FIG. 8 shows a respective two-dimensional constellation for differing numbers of input bits J, from 2 to 4. The set of constellation points for a given two-dimensional constellation is listed under the column $x_{base}$. For J=2, the two-dimensional constellation has 4 constellation points each representing a different permutation of J=2 input bits. For J=3, the two-dimensional constellation has 8 points, and for J=4, the two-dimensional constellation has 16 points. The first symbol sequence is generated by repeating the selected $x_{base}$ for a particular constellation, and a particular permutation of the input bits $K_2$ times. In some embodiments, the symbol sequences $x_{base}$ is generated by non-linear spreading where the relationship between the spread symbols in $x_{base}$ is input bit dependent i.e. it uniquely identifies a particular combination of input bit values. Non-linear spreading is helpful to mitigate or reduce inter-transmission interference.

In another example that uses multi-dimensional symbols, $x_{base}$ is determined according to A×BPSK symbol vector where A is a matrix. Here the input bits are modulated to BPSK symbols and the matrix A is applied to produce the desired multi-dimensional symbols. In another example, the matrix A can be applied to produce non-linear spreading. The matrix A can be different for different lengths of the BPSK symbol vector.

In another example of non-sparse first symbol sequence generation, the first symbol sequence generator generates the first symbol sequence x by multiplying the input sequence b with a spreading matrix. Optionally, this can be used to produce a set of $K_1$ symbols which is repeated $K_2$ times where $K=K_1*K_2$.

In another example, the first symbol sequence generator generates the first symbol sequence x by linear spreading where the relationship between the symbols in the symbol sequence x is not dependent on the input bits. Optionally, linear spreading can be used to produce a set of $K_1$ symbols which is repeated $K_2$ times where $K=K_1*K_2$.

In another example, the first symbol sequence generator generates the first symbol sequence x by spreading where spreading sequence is selected from a pool of available spreading sequences. Optionally, spreading can be used to produce a set of $K_1$ symbols which is repeated $K_2$ times where $K=K_1*K_2$.

An example of generation of first symbol sequence by applying a spreading matrix will now be described with reference to FIG. 9. FIG. 9 shows a respective spreading matrix operation for differing numbers of input bits J, from 2 to 4, where $K_1=2$ symbols are produced at the output of the spreading matrix operation. Note that in FIG. 9, "1-2b" is a vector having J entries 1-$b_0$, 1-$b$, ... 1-$b_{J-1}$, where $b_0$ to $b_{J-1}$ are the J input bits. The output of the spreading matrix operation $x_{base}$ is repeated $K_2$ times to produce the first symbol sequence.

In another example, the first symbol sequence generator generates a symbol sequence $c_1$ of size $K_1$ containing independent QAM symbols with $K>=K_1>=2$. For example, the symbol sequence $c_1$ may be [a,b] where a and b are independent 4-QAM symbols. The QAM symbols may be generated, for example using modulations such as BPSK, QPSK, 16QAM, 64QAM, 256QAM and 1024QAM. Optionally, the symbol sequence $c_1$ is repeated by $K_2$ times where $K=K_1*K_2$ and $K_1$ is an integer number between 2 and K.

In another example, the first symbol sequence generator generates the symbol sequence x by symbol dependent spreading (for example U.S. application No. 62/508,876 filed May 19, 2017 entitled "Method and System for non-orthogonal Multiple Access Communication" hereby incorporated by reference in its entirety, paragraphs 10, 11) or by linear or non-linear spreading (see for example the same reference introduced above, paragraphs 41, 42).

In another example, the signature association can be in the bit domain. A signature in the bit domain can, for example, be a UE/layer specific bit interleaver and/or bit scrambler. Bit domain signature association can be achieved also by the use of particular operations and/or methods at the FEC. The interleaver/scrambler inside the FEC can be a unique identifier. The FEC structure (eg. Trellis structure of the convolutional code, parity check/generator matrix of linear code, generator matrix of LDPC code etc) can be a unique identifier. The bit output of the FEC is associated with a signature in the bit domain and therefore, the non-sparse symbol sequence generated from the bit output of the FEC is also associated with a signature. The non-sparse symbol sequence produced from such bit sequences by applying the methods/techniques such as modulation by conventional QAM modulator and/or linear or non-linear spreading and/or other methods is also associated with a MA signature. Note that the symbol domain operations performed for the bit sequence output of the FEC may or may not change the size of the associated signature space.

Phase and Amplitude Adjustment Matrix

In general, a phase and amplitude adjustment matrix is a diagonal matrix with non-zero diagonal elements in the form:

$\Phi \in \mathbb{C}^{K \times K}$ is a diagonal matrix of the form $$\begin{pmatrix} \alpha_1 e^{j\phi_1} & \cdots & 0 \\ \vdots & \ddots & \vdots \\ 0 & \cdots & \alpha_K e^{j\phi_K} \end{pmatrix}$$

where $0 \le \alpha_i \le 1$ and $0 \le \phi_i 2\pi$, $i=1, \ldots, K$ $\alpha_i=1$ and $\phi_i=0$, $\forall i$ represents the case that $x=x_1$. In some embodiments, values for $\phi_1$, $\phi_2$, $\alpha_i$ are based on one or more factors such as PAPR requirements, power adjustments, improving signal-to-interference noise ratio (SINR), mitigating intra- and inter-cell interference etc. This may, for example, be the interference caused to the UEs within the same BS coverage area or between cells.

Note that for K=1, no phase rotation needed, i.e. $\Phi=1$. For K=2, the phase rotation matrix can be generated as:

$$\Phi_{base} = \begin{bmatrix} e^{j\phi_1} & 0 \\ 0 & e^{j\phi_2} \end{bmatrix}$$

where in a specific example $\phi_1$ and $\phi_2$ are obtained from the following:

| Index | 1 | 2 | 3 | 4 | 5 | 6 | 7 | 8 | 9 |
|---|---|---|---|---|---|---|---|---|---|
| $\phi_1$ | 0 | 0 | 0 | $\pi/3$ | $\pi/3$ | $\pi/3$ | $2\pi/3$ | $2\pi/3$ | $2\pi/3$ |
| $\phi_2$ | 0 | $\pi/3$ | $2\pi/3$ | 0 | $\pi/3$ | $2\pi/3$ | 0 | $\pi/3$ | $2\pi/3$ |

It can be seen that different values for $\phi_1$ and $\phi_2$ are defined for each of 9 different index values. With this example, there are 9 possible different phase rotation matrixes that can be applied, such that the signature space is extended by a factor of 9. The specific matrix to use for a particular UE can be obtained from the table and an index value. In some embodiments, the index to be used by a given UE is obtained from the UE ID which is obtained from the UE for example through radio resource control (RRC) signaling and/or DCI, MAC-CE. Alternatively, in another embodiment, the index can be explicitly signaled to the UE. Signaling is discussed in further detail below.

In some embodiments, for even values of K, phase rotation matrix $\Phi$ can be obtained from $\Phi_{base}$ by repeating its diagonal elements:

$$\Phi = \begin{pmatrix} \Phi_{base} & \cdots & 0 \\ \vdots & \ddots & \vdots \\ 0 & \cdots & \Phi_{base} \end{pmatrix}$$

In addition to the use of $\Phi$ for MA signature definition, $\Phi$ can also be used to optimize the PAPR performance. When the relative phase change of adjacent two symbols of a symbol sequence is large, the PAPR can be large. By adjusting the matrix $\phi$, these phases can be adjusted and subsequently, the resulting symbol sequences associated with such MA signatures can have comparatively low PAPR properties.

Signature Space Extension Matrix S

In some embodiments, the signature space extension matrix is selected or allocated from a pool of available signature space extension matrices. In a specific example, the pool of signature space extension matrices consists of a set of diagonal matrices of size K×K in which the diagonal elements are obtained by one of:

generating sequences of length K, where the sequence elements are taken from a given alphabet. In some embodiments, the alphabet consists of constant-amplitude complex numbers. In another embodiment, the alphabet is {1, −1, j, −j, 1+j, 1−j, −1+j, −1−j, 0} generating sequences of length K using Zadoff-Chu (ZC) sequences of length K with different roots;

generating sequences of length K by Grassmannian signatures;

generating sequences of length K wherein the cross-correlation between any pair of sequences is less than a given threshold.

Note that the amplitude and phase adjustment matrix is also an example of a signature space extension matrix.

FIG. 10A is a specific example of a set of four signature space extension matrices S for K=2 using alphabet {1, −1, j, −j}. Here, there are four indices each associated with a respective different matrix in the set.

FIG. 10B is a specific example of a set of sixteen signature space extension matrices S for K=4 again using alphabet {1, −1, j, −j}. Here, there are 16 indices each associated with a respective different matrix in the set.

Figure 11:
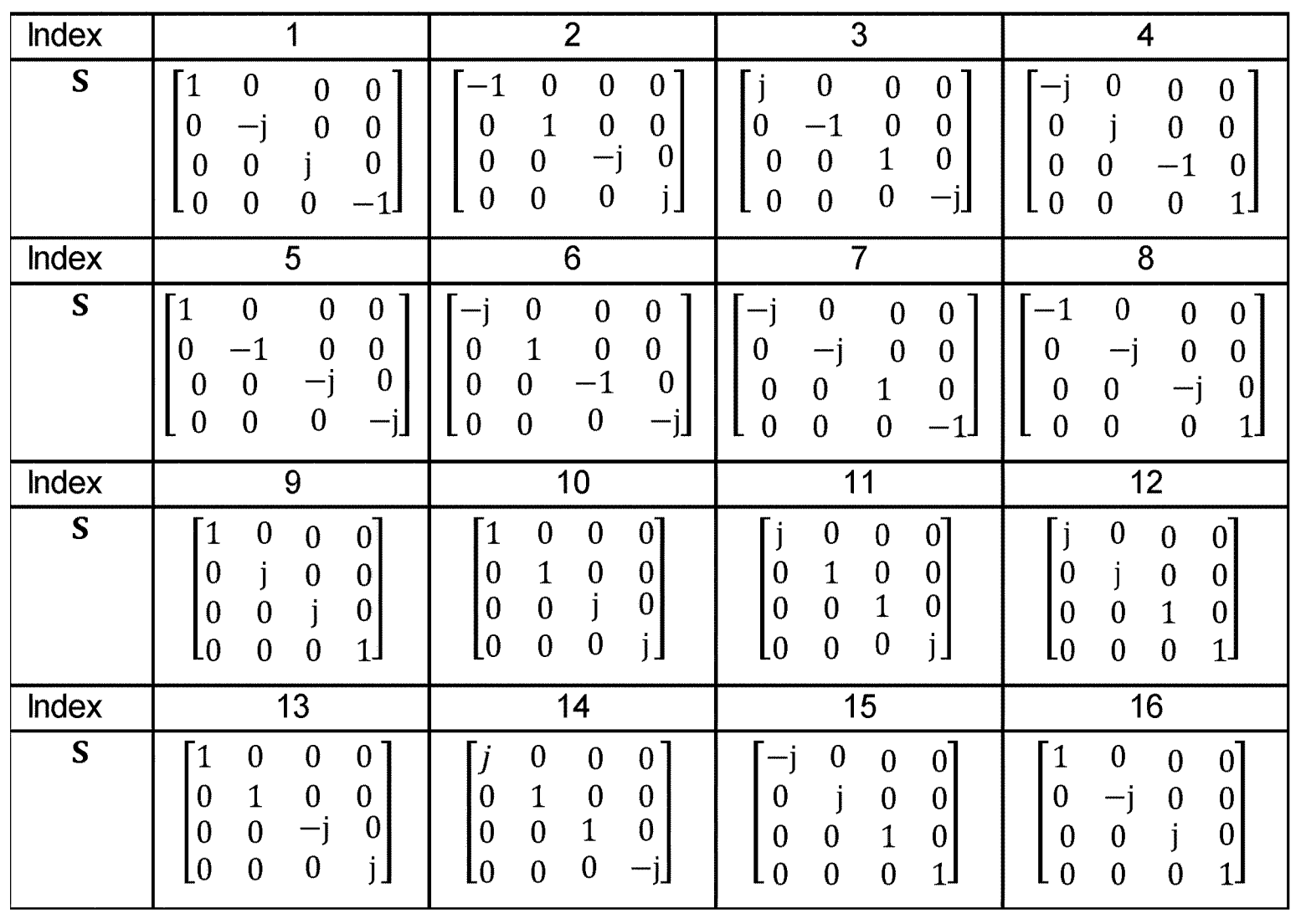

FIG. 11 is a specific example of a set of four signature space extension matrices S for K=2 using ZC Sequences of length 4. Here, there are 16 indices each associated with a respective different matrix in the set.

The specific signature space extension matrix to use for a particular UE can be obtained from the table and an index value. In some embodiments, the index to be used by a given UE is obtained from the UE ID which is obtained from the UE for example through RRC (Radio Resource Control) signaling. Alternatively, in another embodiment, the index can be explicitly signaled to the UE, for example, MAC-CE (MAC-Control Element)/DCI (Downlink Control Information) signaling. Other form of signaling are not precluded.

In some embodiments, the MA signature is defined as the corresponding selection of a phase rotation matrix $\Phi$ or a signature space extension matrix S or a combination thereof.

In some embodiments, a MA signature index can be defined as the index vector $(i_1, i_2)$ in which $x_{mod} S^{\{i\}}(i_1) \Phi^{\{l\}}(i_2) x$ where $i_1$ denotes the index of the signature space extension matrix S out of total i entries and $i_2$ denotes the index of the phase rotation matrix $\Phi$ out of total l entries.

The following is an example of the above-described approach. The symbol sequence $x_{mod} = [x_1 \ x_2]^T$ of length 2 is obtained by $x_{mod} = S^{\{i\}} x_1$ where $$S^{\{4\}} = \left\{ \begin{bmatrix} 1 & 0 \\ 0 & 1 \end{bmatrix}, \begin{bmatrix} 1 & 0 \\ 0 & -1 \end{bmatrix}, \begin{bmatrix} 1 & 0 \\ 0 & j \end{bmatrix}, \begin{bmatrix} 1 & 0 \\ 0 & -j \end{bmatrix} \right\}.$$

In this case, i=4 and l=1 (so $x_1=$).

As noted above previously, optionally sparsity is introduced in the symbol-to-RE mapper. Continuing with the example, the transmitted symbol sequence of length N=4 after resource mapping is obtained by applying a sparsity pattern a selected sparsity pattern from the set of possible patterns defined by columns of $$\begin{bmatrix} 1 & 1 & 1 & 0 & 0 & 0 \\ 1 & 0 & 0 & 1 & 1 & 0 \\ 0 & 1 & 0 & 1 & 0 & 1 \\ 0 & 0 & 1 & 0 & 1 & 1 \end{bmatrix}$$

where the positions of the "1"s indicate where the components of $x_{mod}$ are mapped. Since there are four possibilities for the signature space extension matrix, and six possibilities for the sparsity pattern, the resulting signature pool size is 24.

By defining $$S_1^{(2)} = \left\{ \begin{bmatrix} 1 & 0 \\ 0 & 1 \end{bmatrix}, \begin{bmatrix} 1 & 0 \\ 0 & -1 \end{bmatrix} \right\} \text{ or } \left\{ \begin{bmatrix} 1 & 0 \\ 0 & j \end{bmatrix}, \begin{bmatrix} 1 & 0 \\ 0 & -j \end{bmatrix} \right\},$$

combined with the same set of sparsity patterns, the resulting signature pool size is 12.

In some embodiments, for flexible overloading capability or performance optimization, a subset from a larger pool size can be selected. It is noted this approach is not limited to this example, but can be used with any of the embodiments described herein. For example, where the signature pool size is 24, the number of signatures actually used can be 18 in a particular instance. If a base station serves only 18 UEs, defining 24 signatures will reduce the performance of the system because the correlation of 24 signatures is higher compared to 18 and therefore, decoding performance is poorer for the 24 signature case. As such, reducing the size of the signature pool in such cases can improve performance. For flexible overloading capability or performance optimization, signature pools of different sizes (1 to 24) can be determined. This involves starting with a set of signatures defined using one of the approaches described herein, and then determining different subsets of the signature pool having different sizes based on some optimization criteria.

In addition, in some embodiments, the UE uses the second symbol sequence some of the time, but has the option of using the first symbol sequence some of the time. This may be done based on signaling from the network or based (for example using one of the signaling mechanisms discussed below) on a determination made locally by the UE. This approach can be used for any of the embodiments described herein.

Method for Generating Sparse Modulated Symbol Sequence

In another embodiment, the first symbol sequence x is a sparse sequence that is generated by mapping the input bit sequence b using one of a plurality of sparsity patterns. Then, a MA signature space modifier modifies the signature space. In this case, the MA signature space modifier is adjusted to account for the sparsity pattern used for the first symbol sequence. In a specific example, there are two MA signature space modifiers that include a phase rotation matrix multiplier which applies a phase rotation matrix $\Phi$ to generate the symbol sequence $x_1 = \Phi x$ and followed by a signature space extension matrix multiplier which applies a matrix S to generate the final symbol sequence $x_{mod} = S x_1$ to be mapped to the available resource elements through symbol-to-RE mapping block In this embodiment, a MA signature is defined based on the sparsity pattern used to generate the first symbol sequence, the phase rotation matrix D and the signature space extension matrix (S). This can, for example, be configured based on which entry on the respective pool is selected for each one, for example using a respective index.

Figures 12, 13:
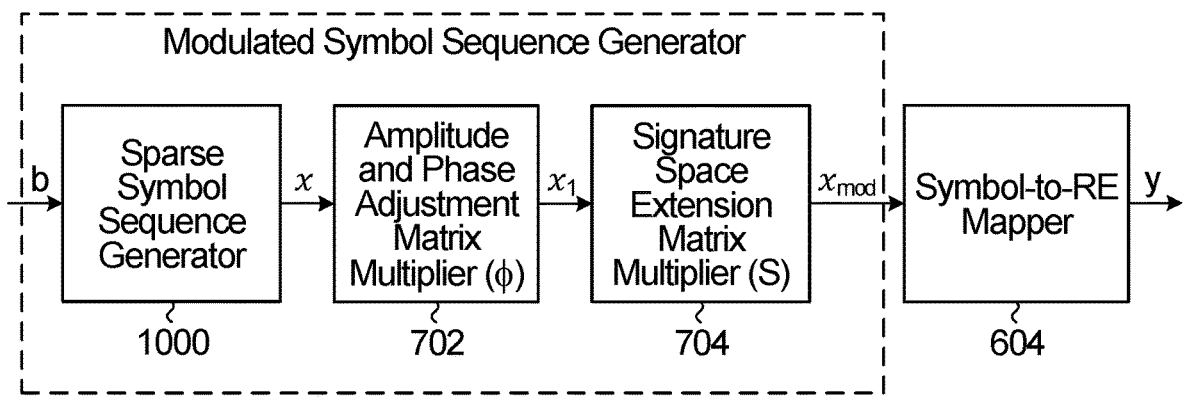
FIG. 12 depicts a block diagram of a modulated symbol sequence generator comprised of a sparse symbol sequence generator, an amplitude and phase adjustment matrix multiplier and a signature space extension matrix multiplier.
FIG. 13 depicts a table showing generation of a first symbol sequence by applying QAM modulation.

In this embodiment, the symbol-to-RE mapping can be defined as one-to-one mapping as the sparse mapping is absorbed into the first symbol sequence generator block Referring now to FIG. 12, shown is a block diagram of a system for generating a sparse modulated symbol sequence. This system includes the same components as FIG. 7, except that now the non-sparse symbol sequence generator 700 of FIG. 7 is replaced with a sparse symbol sequence generator 1000 in FIG. 12. In this embodiment, a MA signature defined based on all the blocks including first symbol sequence generator 1000, amplitude and phase adjustment matrix D and also sequence signature space extension matrix (S) based on which entry in a respective pool is selected for each one.

The sparse first symbol sequence generator 1000 generates a sequence x of length K, of which N elements are non-zero (and K-N elements are zero).

A first example method of generating the sequence x involves generating a QAM symbol based on the input b, and repeating the QAM symbol N times and generating the final sequence by incorporating the sparsity pattern on top of the generated symbols. The QAM symbols can be generated for example using one of BPSK, QPSK, 16QAM, 64QAM, 256QAM and 1024QAM.

In another example, the first symbol sequence generator generates a symbol sequence $c_3$ of size $K_3$ containing independent QAM symbols where $K_3 \geq 1$. The QAM symbols may be generated, for example using modulations such as BPSK, QPSK, 16QAM, 64QAM, 256QAM and 1024QAM. Final symbol sequence of length K is generated by incorporating the sparsity pattern on top of the generated symbols of length $K_3$ where $K \geq K_3$. Optionally, in this example, the symbol sequence $c_3$ is repeated $K_2$ times where $K \geq K_3 * K_2$, $K_2$ is an integer number between 1 and K and sparsity pattern is incorporated on top of the generated symbols of length $K_3 * K_2$.

In another example, a sparse symbol sequence $c_3$ of length $K_3$ is repeated $K_2$ times where $K = K_3 * K_2$, $K_2$ is an integer number between 1 and K.

FIG. 13 shows an example of generation of first symbol sequence x by applying QAM modulation. $x_{qam}$ is generated by mapping the input bit sequence b using a modulation such as BPSK, QPSK, 16QAM, 64QAM, 256QAM and 1024QAM, for example depending on the size of the input bit sequence. Each one of four different sparsity patterns has a respective index.

A second example method of generating the sequence x involves generating a multi-dimensional symbol c of size $N_1$ and repeating it $N_2$ times where $N = N_1 \times N_2$ and $N_1$ is an integer number between 2 and N. The final sequence x is determined by incorporating the sparsity pattern on top of the generated symbols. For example, the final sequence can be generated using SCMA codebooks.

FIG. 14 shows an example of generating x based on SCMA codebooks for K=4 and N=2. To begin, symbols $s_1$ and $s_2$ are the elements of $x_{base} = (s_1, s_2)$ obtained from table 1200. Respective possible values of $x_{base}$ are defined for differing numbers of input bits J. Table 1202 shows six different sparsity patterns each having a respective index.

A third example method of generating the sequence x involves multiplying the input sequence b with a spreading matrix to generate the non-zero components and generating the final sequence by incorporating the sparsity pattern on top of the generated symbols.

FIG. 15 shows an example of generating x by the input sequence b with a spreading matrix 1300 (three matrices shown for different numbers of input symbols J) to generate the non-zero components and generating the final sequence by incorporating the sparsity pattern on top of the generated symbols, where the sparsity pattern is one of the six patterns in table 1302 each having a respective index.

A fourth example method of generating the sequence x involves multiplying the input sequence b with a spreading matrix in which the sparsity pattern is already incorporated in the spreading matrix.

A fifth example method of generating the symbol sequence x involves using symbol dependent spreading or by linear or non-linear spreading, for example using a method in the above-identified reference, and generating the final sequence by incorporating the sparsity pattern on top of the generated symbols In another example, the signature association can be in the bit domain. A signature in bit domain can be a UE/layer specific bit interleaver and/or bit scrambler. Bit domain signature association can be achieved also by the use of particular operations and/or methods at the FEC. The interleaver/scrambler inside the FEC can be a unique identifier. The FEC structure (eg. Trellis structure of the convolutional code, parity check/generator matrix of linear code, generator matrix of LDPC code etc) can be a unique identifier. The bit output of the FEC is associated with a signature in the bit domain and therefore, the sparse symbol sequence generated from bit output of FEC is also associated with a signature. The sparse symbol sequence produced from such bit sequences by applying the methods/techniques such as modulation by conventional QAM modulator and/or linear or non-linear spreading and/or other methods is also associated with a MA signature. Note that the symbol domain operations performed for the bit sequence output of the FEC may or may not change the size of the associated signature space.

For embodiments based on a sparse first symbol sequence, the phase rotation matrix can be generated as in the non-sparse embodiment, with sparsity incorporated into the diagonal elements of the phase rotation matrix.

For example, sparsity may be defined by the columns of a sparsity matrix Sp, each column representing a sparsity pattern. A diagonal matrix can be defined from each of the columns of Sp. For example, from first column we have Sp1=diag(1 1 0 0).

$$Sp = \begin{bmatrix} 1 & 1 & 1 & 0 & 0 & 0 \\ 1 & 0 & 0 & 1 & 1 & 0 \\ 0 & 1 & 0 & 1 & 0 & 1 \\ 0 & 0 & 1 & 0 & 1 & 1 \end{bmatrix}$$

Define $\phi$ to be the phase rotation matrix as another diagonal matrix $\phi=\text{diag}(\phi_1,\phi_2,\phi_3,\phi_4)$. To introduce sparsity into this matrix simply involves multiplying the phase rotation matrix by the selected diagonal matrix associated with one of the columns in the sparsity matrix. The resulting phase rotation matrix, now adjusted to accommodate sparsity, is determined as the product of $(\phi \times Sp1)$ or $(Sp1 \times \phi) = (\phi_1,\phi_2,0,0)$.

The signature space extension matrix can be the same as any of the examples for non-sparse first symbol sequences, but used to generate a sequence of length N. The length N sequence is then extended of length K to length K by incorporating the sparsity pattern used in generating the first symbol sequence. This can be done in a manner similar to that explained above for the phase rotation matrix.

In a specific example, the table of FIG. 10B can be used which involves generating a signature space extension matrix for N=4 using alphabet $\{1,-1,j,-j\}$.

In a specific example, the table of FIG. 11 can be used which involves generating a signature space extension matrix for N=4 using ZC sequence of length 4. A similar approach can be used for any N using elements of ZC sequences.

In this embodiment, the MA signature can be defined as the corresponding selection of phase rotation matrix $\Phi$ or the signature space extension matrix S or a combination thereof, and the sparsity pattern.

In some embodiments, the MA signature index is defined as the index vector $(i_1,i_2,i_3)$ in which $x_2=S^{\{i\}}(i_1)\Phi^{\{l\}}(i_2)x^{\{m\}}(i_3)$ where $i_1$ denotes the index of the signature space extension matrix S out of total i entries and $i_2$ denotes the index of the phase rotation matrix $\Phi$ out of total l entries and $i_3$ denotes the index of the first symbol sequence generator x out of total m entries which is related to the sparsity pattern index.

The following is a specific example. The symbol sequence $x_{ext}$ of length 4 is obtained by $x_{ext}=S^{\{4\}}x_1$ Where $$S^{\{4\}} = \left\{ \begin{bmatrix} 1 & 0 & 0 & 0 \\ 0 & 1 & 0 & 0 \\ 0 & 0 & 1 & 0 \\ 0 & 0 & 0 & 1 \end{bmatrix}, \begin{bmatrix} 1 & 0 & 0 & 0 \\ 0 & 1 & 0 & 0 \\ 0 & 0 & -1 & 0 \\ 0 & 0 & 0 & -1 \end{bmatrix}, \begin{bmatrix} 1 & 0 & 0 & 0 \\ 0 & 1 & 0 & 0 \\ 0 & 0 & j & 0 \\ 0 & 0 & 0 & j \end{bmatrix}, \begin{bmatrix} 1 & 0 & 0 & 0 \\ 0 & 1 & 0 & 0 \\ 0 & 0 & -j & 0 \\ 0 & 0 & 0 & -j \end{bmatrix} \right\}.$$

Using the sparsity pattern defined in the previous example gives i=4, l=1, m=6. In this case, the total number of MA signatures become 24.

As in the previous example, for flexible overloading capability or performance optimization, a subset from a larger pool size can be selected. Alternatively, signature pools of smaller size can be found from a computer search.

In the above-described example, sparsity is introduced in the first symbol sequence generator. In another embodiment, sparsity is introduced in the signature space extension matrix combined with the resource mapping.

In this case, x and $x_1$ are size N sequences and $x_{mod}$ is a size K sequence and the signature space extension matrix is of size K×N in which the sparsity pattern defined by resource mapping is incorporated into the matrix.

The following is a specific example. The transmitted symbol sequence $x_{mod}$ of length K=4 is obtained by $x_{mod}=S^{\{4\}}x_1$, where assuming a sparsity pattern of 1100 (first column of Sp below)

$$S^{\{4\}} = \left\{ \begin{bmatrix} 1 & 0 \\ 0 & 1 \\ 0 & 0 \\ 0 & 0 \end{bmatrix}, \begin{bmatrix} 1 & 0 \\ 0 & -1 \\ 0 & 0 \\ 0 & 0 \end{bmatrix}, \begin{bmatrix} 1 & 0 \\ 0 & j \\ 0 & 0 \\ 0 & 0 \end{bmatrix}, \begin{bmatrix} 1 & 0 \\ 0 & -j \\ 0 & 0 \\ 0 & 0 \end{bmatrix} \right\}$$

and $S^{\{4\}}$ is defined for a given sparsity pattern/sparse spreading/physical resource mapping defined by the first column of $$Sp = \begin{bmatrix} 1 & 1 & 1 & 0 & 0 & 0 \\ 1 & 0 & 0 & 1 & 1 & 0 \\ 0 & 1 & 0 & 1 & 0 & 1 \\ 0 & 0 & 1 & 0 & 1 & 1 \end{bmatrix}.$$

The first column of Sp is $[1\ 1\ 0\ 0]^T$. Therefore, the first two rows of $S^{\{4\}}$ is non-zero while $3^{rd}$ and $4^{th}$ are zero. If it was defined with respect the last column of Sp=$[0\ 0\ 1\ 1]^T$ the $3^{rd}$ and $4^{th}$ rows of such defined $S^{\{4\}}$ will have non-zero entries. In this case, the total number of MA signatures is 24.

For flexible overloading capability or performance optimization, a subset from a larger pool size can be selected or allocated. Alternatively, signature pools of size 1 to 24 can be determined e.g. from a computer search.

In some embodiments, a UE uses multiple MA signatures for transmitting data, for example a respective MA signature for each of a corresponding set of data streams. In this embodiment, the UE uses a certain number L of MA signatures, and constructs a respective symbol sequence associated with each MA signature. Then, the symbol sequences are superimposed, and the UE transmits the superposed signal. Any of the approaches to NoMA signal generation described herein can be used for each of the data streams.

In some embodiments, L is determined by the network and communicated to the UE, for example through RRC signaling, downlink control information (DCI) signaling or MAC-control element (MAC-CE) or a combination thereof.

L can also be mapped according to spectral efficiency, application scenario and required key performance indicators (KPI) or some other parameter. NoMA is proposed for three use cases, mMTC, URLLC, eMBB.

In mMTC, KPIs are the ability to support large number of connections, low signaling overhead, low power consumption etc. In URLLC, KPIs include reliability within given delay bound, satisfying a large number of connections etc. In eMBB, KPIs include low overhead, high throughput and low latency. More generally KPIs can be defined on an application/use case specific basis.

For example, in URLLC/eMBB cases, to achieve higher throughput each UE may be configured to use L≥2 while for mMTC, UEs may be configured to use L=1 such that the system can support a larger number of UEs. The combinations may be based on the KPI of a given use case.

In some embodiments, the multiple streams of a given UE are combined through superposition. Superposition involves the addition of the complex symbols without any power offset. In other embodiments, power offset may be applied before superposition.

In some embodiments, one or more characteristics of the first symbol sequence (for example one or more of length K, number of non-zero components N, construction mode (QAM or multi-dimensional), etc.) are determined, for example, based on one or a combination of:
  spectral efficiency (SE);
  average traffic load;
  application scenario and required KPI;
  modulation and coding scheme (MCS);
In some embodiments, K is determined by the network. In other embodiments, K is determined by the UE.

In some embodiments, one or more characteristics of first symbol sequence (for example one or more of length K, number of non-zero components N, construction mode (QAM or multi-dimensional), etc) is communicated to the UE based on one or a combination of:
  from network to the UE through RRC signaling
  from network to the UE through DCI
  from network to the UE through MAC-CE
  not communicated (implicit based on SE and MCS)

In some embodiments, the pools for one or both of phase rotation matrix and signature space extension matrix are based on one or a combination of (and more generally for signature space modifier):
  average traffic load;
  PAPR performance;
  receiver capability (multi-user detection) and receiver complexity;
  application scenario and required KPI;
  by network and communicated to the UEs through RRC signaling, DCI signaling, MAC CE (control element) or a combination thereof.

In some embodiments, the MA signature index(ices) for a UE (for example one or a combination of a sparsity pattern index, phase rotation matrix index, signature space extension matrix index) may be determined based on a mapping rule from the UE ID. In some embodiments, the mapping rule is determined by the network and communicated to the UE, for example through
  RRC/DCI signaling or through MAC CE (control element) signaling.

In some cases, for any of the embodiments described herein, the size of the signature pool is adjusted adaptively. The updates are communicated to the UE via explicit or implicit signaling, or the UE independently determines the updated signature pool size, using one of the methods described above.

Figure 16:
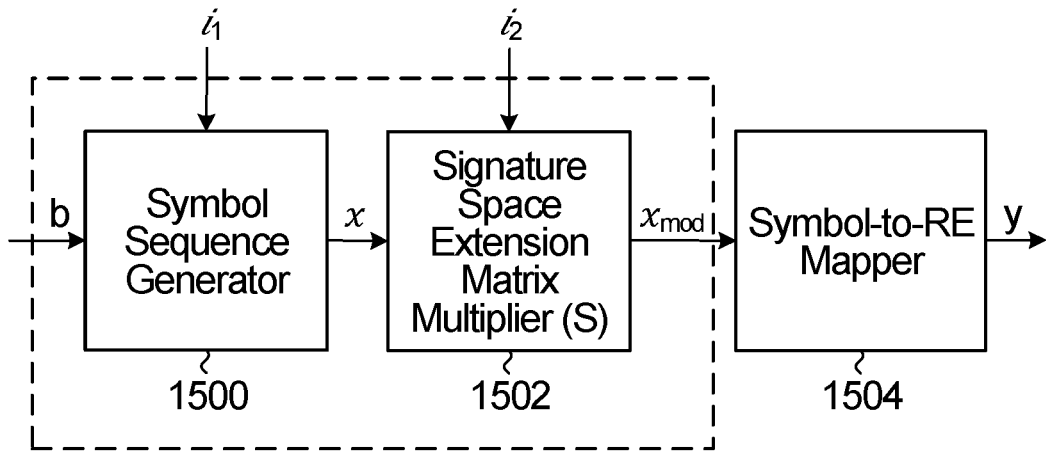
FIG. 16 depicts a block diagram of a NoMA signal generator with inputs to configure the symbol sequence generator and signature space extension matrix multiplier.
Figure 17:
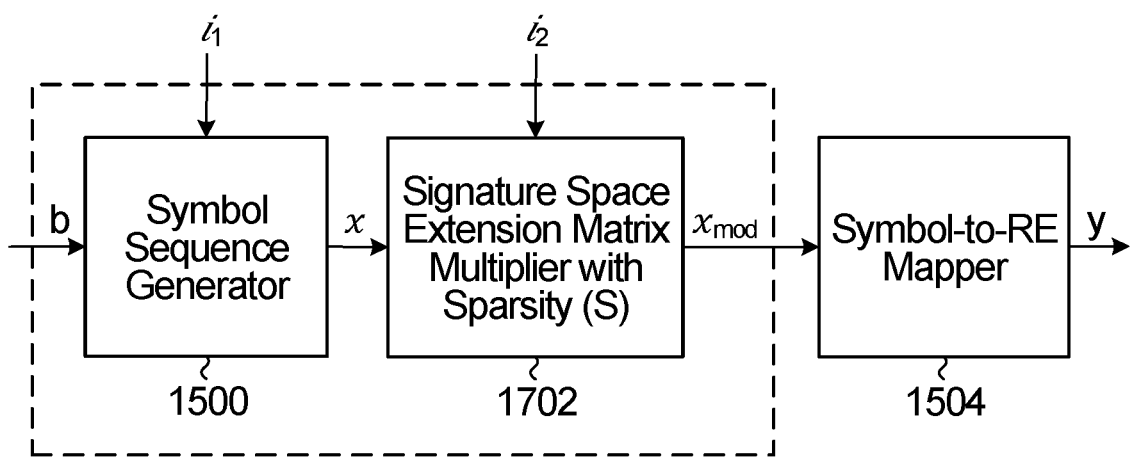
FIG. 17 depicts a block diagram of a NoMA signal generator with a signature space extension matrix multiplier configured to introduce sparsity.
Figure 18:
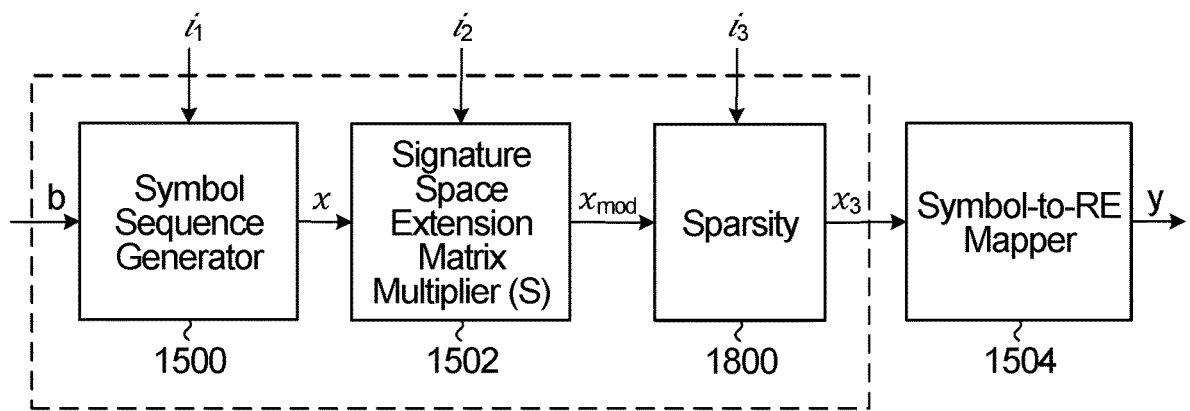
FIG. 18 depicts a block diagram of a NoMA signal generator with a sparsity component at the output of the signature space extension matrix.

FIGS. 16 to 18 depict further specific examples that show input parameters $i_1$, $i_2$, $i_3$. Referring first to FIG. 16, this embodiment is similar to FIG. 6, and all options described or the FIG. 6 embodiment apply here. There is a symbol sequence generator 1500, signature space extension matrix multiplier 1502 (more generally one or more signature space modifiers), and a symbol-to-RE mapper 1504. This embodiment features additional inputs $i_1$, $i_2$ which configure the symbol sequence generator 1500 and the signature space extension matrix multiplier 1502 respectively, for example by selecting a signature space extension matrix. b is a sequence of bits, x, $x_{mod}$ are the first and the second symbol(s) sequences, respectively.

With this embodiment, the network side determines and informs the value(s) for $i_1$, $i_2$ to the UE side. The network may determine the value(s) for $i_1$, $i_2$ based on one or more parameters. Examples include a channel quality indicator, a number of UEs present in the network, a maximum number of UEs that can be supported by the network, a set of (chosen or preferred) values for $i_1$, $i_2$ as indicated or reported by the UE and/or measurements (e.g. indicative of a channel quality) received from the UE. The UE side selects a functionality corresponding to the values of $i_1$, $i_2$ determined by the network, for example from a table look up. Such functionalit(ies) may be expressed by a matrix/vector form mathematically.

Alternatively, values for $i_1$, $i_2$ are not explicitly informed to the UE by network side:
  the UE uses a default value for uninformed value(s); or
  the UE determines the unknown value(s) (Eg. based on the measurements, previous values from the network side etc). UE determination can be autonomous from the network side or implicit/derived from other values reported from network side;
  optionally, the UE reports the chosen value(s) for $i_1$, $i_2$ to the network side.

As before, the symbol to RE mapping ($x_{mod}$ to y block) can be sparse or non-sparse. x also can be sparse in some embodiments. In some embodiments, the length of x can be 1. Moreover, when the functionalities corresponding to $i_1$ or $i_2$ are expressed mathematically, for example in matrix/ vector form, the length of the sequences $x, x_{mod}$ are not necessarily the same.

In some embodiments, for the embodiment of FIG. 16 the signature space extension matrix is a unitary or diagonal sequence generation matrix. The matrix can be selected to achieve a low PAPR in the overall MA signature.

Referring now to FIG. 17, shown is another example method for generating modulated symbol sequence. This embodiment is similar to FIG. 16 and the same options apply for network or UE determination of $i_1$, $i_2$ but in this embodiment, the sparsity is introduced in the signature space extension matrix multiplier with sparsity (S) 1702 (more generally in a signature space modifier).

In some embodiments, for the embodiment of FIG. 17, the signature space extension matrix is a unitary or diagonal sequence generation matrix with sparsity. As before, the matrix can be selected to achieve a low PAPR in the overall MA signature.

Referring now to FIG. 18, shown is another example method for generating modulated symbol sequence. This embodiment is similar to FIG. 16, but now there is a sparsity component 1800 which introduces sparsity into the output of the signature space extension matrix multiplier 1502 (more generally a signature space modifier). An input $i_3$ selects the sparsity pattern introduced in the sparsity component 1800. An output sequence $x_3$ is coupled to the input of the symbol-to-RE Mapper 1504. The methods for network or UE determination of $i_1$, $i_2$ described above for the embodiment of FIG. 16 apply to the determination of $i_1$, $i_2$, $i_3$.

In some embodiments, for the embodiment of FIG. 18, the MA signature space extension matrix is a unitary or diagonal sequence generation matrix. The matrix can be selected to achieve a low PAPR in the overall MA signature.

Figure 19:
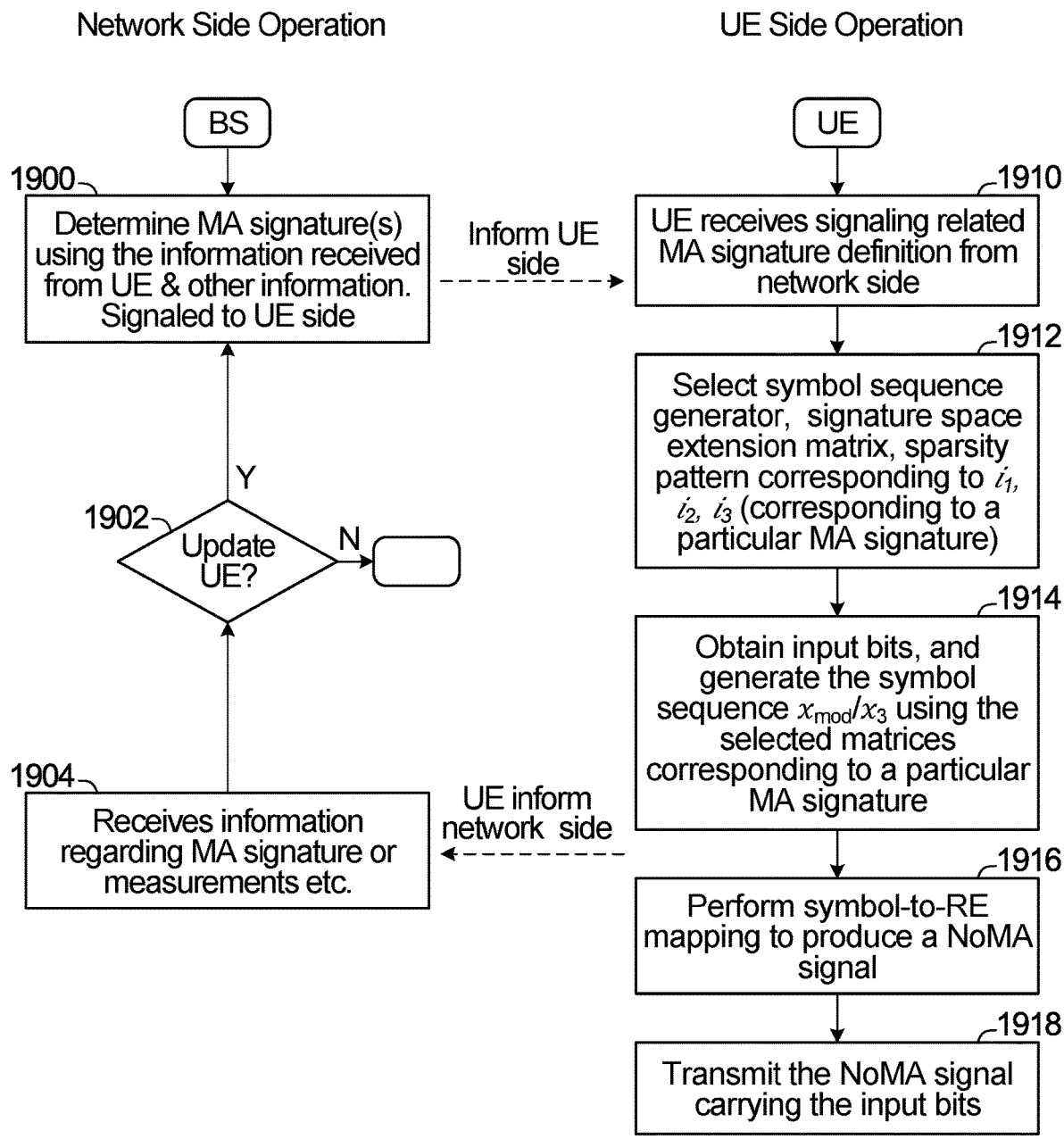
FIG. 19 depicts a flowchart showing NoMA operation on the network side and on the UE side.

FIG. 19 contains a first flowchart of network side operation, and a second flowchart of UE side operation. Combined they represent an embodiment featuring a combination of network and UE side functionality. However, the UE side functionality is an embodiment on its own, and the network side functionality is an embodiment on its own. The functionality of the UE may be replicated by each of a plurality of UEs served by a given base station.

In block 1900, the network side (e.g. a base station (BS)) determines MA signature(s) for example, using the information received from the UE, and the MA signatures determined (or indicators thereof) are signaled to UE side. The determination may alternatively or additionally be based on other information which may, for example, include information concerning other UEs served by the same base station, and information concerning UEs of other base stations. The information signaled to the UE relates to the determined MA signature, and may, for example, include one or more of proposed or preferred values for the indicators $i_1$, $i_2$, $i_3$. In some embodiments, the network transmits signaling to the UE in order to mitigate intra- and inter-cell interference in NoMA transmission. This can be done by controlling $i_1$, $i_2$, $i_3$. Alternatively, the information is not explicitly conveyed to the UE, but rather, the UE and base station independently determine the MA signature based on information both sides are aware of, such that the same result is achieved by both sides.

In another embodiment, based on the information, the network may configure the UE to enable/disable signature space extension. For example, 1 bit signaling can be used to activate or deactivate (e.g. switch on or off) the signature space extension. In another example, signaling may be used to instruct a transmission mode switch between multiple transmission modes. Each transmission mode has associated parameters, and at least one of the transmission modes includes signature space extension suitable for NoMA.

In block 1910, the UE receives signaling related to MA signature definition from the network side. In block 1912, the UE selects first symbol sequence generator, MA signature space extension matrix, sparsity pattern corresponding to the received signaling (the signaling may, for example specify $i_1$, $i_2$, $i_3$). The selected first symbol sequence generator, MA signature space extension matrix and sparsity pattern corresponding to a particular MA signature. In block 1914, the UE obtains input bits, and generates the symbol sequence $x_{mod}, x_3$ using the selected matrices corresponding to a particular MA signature. In block 1916, the UE performs symbol-to-RE mapping to produce a NoMA signal, and in block 1918, the UE transmits the NoMA signal carrying the input bits.

After block 1914 or 1916, optionally, the UE informs the network side of information regarding MA signature (e.g. proposed or preferred values for $i_1$, $i_2$, $i_3$ or measurements), and in block 1904, the network side receives such information from the UE. In block 1902, the network determines whether to update the MA signatures or not. If so, the method continues back at block 1900.

More generally, the measurements referred to in block 1904, measurements can obtained in two ways:
the network side performs the measurements from the UE uplink transmission such as data/control/reference signal/pilot etc.; or
the measurements are made by the UE be reported (explicit or implicit way) to the network side.

Signaling Support

This discussion of signaling support can be used in conjunction with any of the embodiments described herein.

In some embodiments, the network informs the UE which MA signature to use. In a specific example, a base station signals values/indications for one or more of $i_1$, $i_2$, $i_3$.

In some embodiments, BS may also inform to UE to constrain the MA signature pool choices for a UE. BS may explicitly signal $i_1$, $i_2$, $i_3$. Alternatively, the UE can derive the necessary information for MA signature generation from other information received from BS (not necessarily directly connected to MA signature definition/NoMA transmission). For example, single or multiple MA signature(s) may be associated with MCS/MA signature length.

In some embodiments, the UE chooses a MA signature at random or based on UE specific identifier such as a radio network temporary identifier (RNTI). In some embodiments, the UE can decide based on its own measurements.

In a specific example, the UE can be configured to choose 'n (≥1)' MA signature(s) that gives the highest SINR.

In another specific example, the UE can be configured to avoid 'm (≥1)' MA signature(s) that gives the lowest SINR.

In some embodiments, the UE chooses the MA signature or one or more of $i_1$, $i_2$, $i_3$ at random.

A UE may derive MA signatures from combination of above as well. For example $i_1$ may be explicitly signaled and $i_2$ is derived from MCS/MA signature length.

In the embodiments, signaling examples are provided for illustrative purposes and other form of signaling or implicit information exchange from BS to UE and/or UE to BS within the scope of the disclosure are not precluded.

UE and BS Embodiments

In some embodiments, a UE generates a NoMA signal as follows. A set of input bits is obtained. A NoMA signal is then generated to transmit the input bits. The NoMA signal is generated based on: (1) a first symbol sequence, where the first symbol sequence is determined from the set of input bits and is associated with a first MA signature within a first MA signature space; (2) a second symbol sequence, where the second symbol sequence is determined based on the first symbol sequence, and where the second symbol sequence is associated with a second MA signature within a second MA signature space; and (3) a symbol-to-RE mapping applied to the second symbol sequence to produce the NoMA signal.

In some embodiments, the second symbol sequence is determined by applying at least one signature space modifier operation to the first symbol sequence. Applying at least one signature space modifier operation may include applying a phase rotation matrix selected from a plurality of different phase rotation matrices.

In some embodiments, the method may further include using a combined signature space extension matrix and symbol-to-RE mapping that introduces sparsity.

In some embodiments, the first symbol sequence may be sparse. The method may further include generating the sparse first symbol sequence of length K containing N non-zero elements. In some embodiments, generating the sparse first symbol sequence may include using one of a pool of sparsity patterns. In some embodiments, each sparsity pattern has an associated index, and the method further includes using the index to select the sparsity pattern.

In some embodiments, the UE may receive signaling that conveys one or more characteristics of the first symbol sequence based on one or a combination of: RRC signaling; DCI; implicit based on signaling that indicates an MCS.

In some embodiments, a pool for at least one signature space modifier operation may be based on one or a combination of: an average traffic load; a PAPR performance; a receiver capability; an application type; a key performance indicator (KPI); by a network and communicated to the UEs through RRC signaling, DCI signaling, MAC CE (control element) or a combination thereof.

In some embodiments, it may be determined to transmit the NoMA signal with the MA signature extension activated. The determination could be based on i1,i2,i3. In some embodiments, it may be determined to transmit a second NoMA signal with the MA signature extension deactivated. The determination could be based on different values of i1, i2, i3. The second NoMA signal may be transmitted instead of the NoMA signal.

In some embodiments, it may be determined to transmit a second NoMA signal by applying a symbol-to-RE mapping to the first symbol sequence to produce the second NoMA signal, and transmit the second NoMA signal. In some embodiments, the first NoMA signal is transmitted in a first mode of operation and the second NoMA signal is transmitted in a second mode of operation.

In some embodiments, a UE is disclosed for performing any of the UE methods disclosed herein. For example, the UE may have a transmitter to transmit a NoMA signal and a NoMA signal generator to generate the NoMA signal from the set of input bits.

In some embodiments, a method is performed by a base station including transmitting, to a UE, an indication of an MA signature configuration. The MA signature configuration may be determined by the base station, e.g. based on information received from the UE. The indication may indicate parameters $i_1$, and/or $i_2$, and/or $i_3$. The method may further include receiving a NoMA signal from the UE, the NoMA signal having been generated in accordance with the MA signature configuration.

In some embodiments, a base station is disclosed including a transmitter to transmit to the UE an indication of an MA signature configuration, and a receiver to receive a NoMA signal from the UE, the NoMA signal having been generated in accordance with the MA signature configuration. A control system may generate the indication of the MA signature configuration.

Numerous modifications and variations of the present disclosure are possible in light of the above teachings. It is therefore to be understood that within the scope of the appended claims, the disclosure may be practiced otherwise than as specifically described herein.

The invention claimed is:

1. A method comprising:
   obtaining a set of input bits;
   generating a non-orthogonal multiple access (NoMA) signal for transmission of the input bits, comprising:
      determining a first symbol sequence from the set of input bits and associated with a first multiple access (MA) signature within a first MA signature space, wherein the first symbol sequence is one of a plurality of possible first symbol sequences to be determined from the set of input bits, each possible first symbol sequence associated with a respective MA signature within the first MA signature space;
      determining a second symbol sequence having a length same as a length of the first symbol sequence based on the first symbol sequence by applying a phase rotation matrix selected from a plurality of different phase rotation matrices and applying a signature space extension matrix selected from a plurality of different signature space extension matrices, the second symbol sequence being associated with a second MA signature within a second MA signature space, wherein the second symbol sequence is one of a plurality of possible second symbol sequences to be determined from the first symbol sequence, each possible second symbol sequence associated with a respective MA signature within the second MA signature space;
      applying a symbol-to-resource element (RE) mapping to the second symbol sequence to produce the NoMA signal; and
   transmitting the NoMA signal.

2. The method of claim 1 wherein the second MA signature space is larger than or equal in size to the first MA signature space in that a number of second MA signatures in the second signature space is greater than or equal to a number of first MA signatures in the first MA signature space.

3. The method of claim 1 wherein the symbol-to-RE mapping is a selected one of a plurality of different sparse symbol-to-RE mappings.

4. The method of claim 1 further comprising determining the first symbol sequence by at least one of:
   generating a QAM symbol based on the set of input bits, and repeating the QAM symbol K times;
   generating a multi-dimensional symbol c of size $K_1$ based on the set of input bits;
   generating a multi-dimensional symbol c of size $K_1$ based on the set of input bits and repeating c by $K_2$ times where $K=K_1*K_2$ and $K_1$ and $K_2$ are integer numbers between 2 and K;

generating a symbol sequence c of size $K_1$ by non-linear spreading where a relationship between the symbols in the symbol sequence c is input bit dependent;

generating a symbol sequence c of size $K_1$ by non-linear spreading where a relationship between the symbols in the symbol sequence c is input bit dependent, and repeating c by $K_2$ times where $K=K_1*K_2$ and $K_1$ and $K_2$ are integer numbers between 2 and K;

generating a symbol sequence c of size $K_1$ by linear spreading where a relationship between the symbols in the symbol sequence is not dependent on the input bits;

generating a symbol sequence c of size $K_1$ by linear spreading where a relationship between the symbols in the symbol sequence is not dependent on the input bits, and repeating c by $K_2$ times where $K=K_1*K_2$ and $K_1$ and $K_2$ are integer numbers between 2 and K;

generating a symbol sequence $c_1$ of size $K_1$ containing independent QAM symbols with $K>=K_1>=2$;

generating a symbol sequence $c_1$ of size $K_1$ containing independent QAM symbols with $K>=K_1>=2$, and repeating the symbol sequence $c_1$ by $K_2$ times where $K=K_1*K_2$ and $K_1$ and $K_2$ are integer numbers between 2 and K;

multiplying the set of input bits by a spreading matrix; and applying symbol dependent, linear or non-linear spreading to the set of input bits.

5. The method of claim 4 wherein applying a signature space extension matrix selected from a plurality of different signature space extension matrices comprises applying a signature space extension matrix selected from a pool of available K x K signature space extension matrices, wherein for each signature space extension matrix in the pool:

the diagonal elements are taken from a specified alphabet; or the diagonal elements are taken from an alphabet that consists of constant-amplitude complex numbers; or the diagonal elements are taken from Zadoff-Chu (ZC) sequences of length K with different roots; or the diagonal elements are taken from sequences of length K by Grassmannian signatures; or the diagonal elements are taken from sequences, with cross-correlation between any pair of sequences less than a given threshold.

6. The method of claim 1 further comprising applying a sparsity pattern as part of generating the first symbol sequence, or as part of generating the second symbol sequence or as part of the symbol-to-RE mapping.

7. The method of claim 6 further comprising determining an index for one or a combination of:

a sparsity pattern index;

a phase rotation matrix index for use in modifying the first MA signature space; and a signature space extension matrix for use in modifying the first MA signature space.

8. The method of claim 1 further generating the NoMA signal to contain a plurality of data streams, each having an associated respective MA signature from within the second signature space.

9. The method of claim 1 further comprising determining to transmit a second NoMA signal, applying a symbol-to-RE mapping to the first symbol sequence to produce the second NoMA signal, and transmitting the second NoMA signal.

10. The method of claim 9 further comprising:

receiving signaling indicating whether to transmit the NoMA signal or the second NoMA signal.

11. The method of claim 1, wherein a size of the first MA signature is 1.

12. The method of claim 1, further comprising:

receiving from a base station a signalling related to at least one MA signature index representing one or a combination of a sparsity pattern index, phase rotation matrix index, and signature space extension matrix index.

13. The method of claim 6, wherein generating the first symbol sequence further comprising:

generating a QAM symbol based on the set of input bits;

generating multiple symbols by repeating the QAM symbol; and generating the first symbol sequence by incorporating the sparsity pattern on top of the generated multiple symbols.

14. A user equipment (UE) comprising:

a NoMA signal generator to generate a NoMA signal that transmits input bits; and a transmitter to transmit the NoMA signal;

wherein the NoMA signal generator is to generate the NoMA signal by:

determining a first symbol sequence from the set of input bits and associated with a first multiple access (MA) signature within a first MA signature space, wherein the first symbol sequence is one of a plurality of possible first symbol sequences to be determined from the set of input bits, each possible first symbol sequence associated with a respective MA signature within the first MA signature space;

determining a second symbol sequence having a length same as a length of the first symbol sequence based on the first symbol sequence by applying a phase rotation matrix selected from a plurality of different phase rotation matrices and applying a signature space extension matrix selected from a plurality of different signature space extension matrices, the second symbol sequence being associated with a second MA signature within a second MA signature space, wherein the second symbol sequence is one of a plurality of possible second symbol sequences to be determined from the first symbol sequence, each possible second symbol sequence associated with a respective MA signature within the second MA signature space;

applying a symbol-to-resource element (RE) mapping to the second symbol sequence to produce the NoMA signal.

15. The UE of claim 14 wherein the second MA signature space is larger than or equal in size to the first MA signature space in that a number of second MA signatures in the second signature space is greater than or equal to a number of first MA signatures in the first MA signature space.

16. The UE of claim 14 wherein the symbol-to-RE mapping is a selected one of a plurality of different sparse symbol-to-RE mappings.

17. The UE of claim 14, wherein the NoMA signal generator is further to: determine the first symbol sequence by at least one of:

generating a QAM symbol based on the set of input bits, and repeating the QAM symbol K times;

generating a multi-dimensional symbol c of size $K_1$ based on the set of input bits;

generating a multi-dimensional symbol c of size $K_1$ based on the set of input bits and repeating c by $K_2$ times where $K=K_1*K_2$ and $K_1$ and $K_2$ are integer numbers between 2 and K;

generating a symbol sequence c of size $K_1$ by non-linear spreading where a relationship between the symbols in the symbol sequence c is input bit dependent;

generating a symbol sequence c of size $K_1$ by non-linear spreading where a relationship between the symbols in the symbol sequence c is input bit dependent, and repeating c by $K_2$ times where $K=K_1*K_2$ and $K_1$ and $K_2$ are integer numbers between 2 and K;

generating a symbol sequence c of size $K_1$ by linear spreading where a relationship between the symbols in the symbol sequence is not dependent on the input bits;

generating a symbol sequence c of size $K_1$ by linear spreading where a relationship between the symbols in the symbol sequence is not dependent on the input bits, and repeating c by $K_2$ times where $K=K_1*K_2$ and $K_1$ and $K_2$ are integer numbers between 2 and K;

generating a symbol sequence $c_1$ of size $K_1$ containing independent QAM symbols with $K>=K_1>=2$;

generating a symbol sequence $c_1$ of size $K_1$ containing independent QAM symbols with $K>=K_1>=2$, and repeating the symbol sequence $c_1$ by $K_2$ times where $K=K_i*K_2$ and $K_1$ and $K_2$ are integer numbers between 2 and K;

multiplying the set of input bits by a spreading matrix; and applying symbol dependent, linear or non-linear spreading to the set of input bits.

18. The UE of claim 17 wherein applying a signature space extension matrix selected from a plurality of different signature space extension matrices comprises applying a signature space extension matrix selected from a pool of available K x K signature space extension matrices, wherein for each signature space extension matrix in the pool:

the diagonal elements are taken from a specified alphabet; or the diagonal elements are taken from an alphabet that consists of constant-amplitude complex numbers; or the diagonal elements are taken from Zadoff-Chu (ZC) sequences of length K with different roots; or the diagonal elements are taken from sequences of length K by Grassmannian signatures; or the diagonal elements are taken from sequences, with cross-correlation between any pair of sequences less than a given threshold.

19. The UE of claim 14, wherein the NoMA signal generator is further to: apply a sparsity pattern as part of generating the first symbol sequence, or as part of generating the second symbol sequence or as part of the symbol-to-RE mapping.

20. The UE of claim 19, wherein the NoMA signal generator is further to determine an index for one or a combination of:

a sparsity pattern index;

a phase rotation matrix index for use in modifying the first MA signature space; and a signature space extension matrix for use in modifying the first MA signature space.

21. The UE of claim 14, wherein the NoMA signal generator is further to: generate the NoMA signal to contain a plurality of data streams, each having an associated respective MA signature from within the second signature space.

22. The UE of claim 14, comprising circuitry to: determine to transmit a second NoMA signal; apply a symbol-to-RE mapping to the first symbol sequence to produce the second NoMA signal; and transmit the second NoMA signal.

23. The UE of claim 22 further comprising a receiver to receive signaling indicating whether to transmit the NoMA signal or the second NoMA signal.

\* \* \* \* \*